(12) United States Patent
Tanaka et al.

(10) Patent No.: US 7,931,952 B2
(45) Date of Patent: Apr. 26, 2011

(54) WATER-RETAINABLE MOLDING AND METHOD FOR MANUFACTURING THE SAME

(75) Inventors: Akinori Tanaka, Kyoto (JP); Takao Hine, Kyoto (JP)

(73) Assignee: Shinsei Techno Co. Ltd., Osaka (JP)

( * ) Notice: Subject to any disclaimer, the term of this patent is extended or adjusted under 35 U.S.C. 154(b) by 417 days.

(21) Appl. No.: 11/915,935

(22) PCT Filed: May 30, 2006

(86) PCT No.: PCT/JP2006/311172
§ 371 (c)(1),
(2), (4) Date: Nov. 29, 2007

(87) PCT Pub. No.: WO2006/129838
PCT Pub. Date: Dec. 7, 2006

(65) Prior Publication Data
US 2009/0311505 A1  Dec. 17, 2009

(30) Foreign Application Priority Data

May 31, 2005 (JP) ................ 2005-158320
Nov. 10, 2005 (JP) ................ 2005-326110
Nov. 10, 2005 (JP) ................ 2005-326111

(51) Int. Cl.
*B32B 5/12* (2006.01)
*B32B 5/18* (2006.01)
*E04C 1/00* (2006.01)
*C04B 35/66* (2006.01)

(52) U.S. Cl. ........ 428/113; 428/109; 428/158; 428/172; 428/294.7; 428/304.4; 428/913; 106/711; 52/309.17

(58) Field of Classification Search .......... 428/156, 428/158, 304.4, 109, 113, 172, 294.7, 913; 404/18, 29, 34, 44, 45; 52/309.12, 309.17, 52/602, 603, 605; 106/711
See application file for complete search history.

(56) References Cited

U.S. PATENT DOCUMENTS
3,145,502 A * 8/1964 Rubenstein ............ 52/223.7

FOREIGN PATENT DOCUMENTS
JP  07-109165 A  4/1995
(Continued)

OTHER PUBLICATIONS

European Search Report dated Sep. 15, 2010, issued in corresponding European Patent Application No. 06747152.4-1213.

*Primary Examiner* — Donald Loney
(74) *Attorney, Agent, or Firm* — Westerman, Hattori, Daniels & Adrian, LLP

(57) ABSTRACT

A water-retainable molding is formed by mixing and hardening cement, fiber bundles and fiber masses, and includes first pores inside the fiber bundles, second pores between fiber bundles and a cement gel, third pores inside the fiber masses, fourth pores between the adjacent fiber masses, and fifth pores due to discharge of water content and air inside a platelike block. The first, second and fifth pores are employed as a capillary portion, the third pores are employed as a water-retaining portion, and the fourth pores are employed as a water communicating opening portion. When water is supplied to the surface, the water is absorbed from the fourth pores as well as the first, second and fifth pores, and is retained in the third pores. Furthermore, when the temperature rises, the water content is supplied from the third pores to the surface through the first, second and fifth pores so as to be evaporated and to control the temperature of the molding.

11 Claims, 25 Drawing Sheets

FOREIGN PATENT DOCUMENTS

| | | |
|---|---|---|
| JP | 2001-158676 A | 6/2001 |
| JP | 2002-173353 A | 6/2002 |
| JP | 2003-027407 A | 1/2003 |
| JP | 2003-064607 A | 3/2003 |
| JP | 2003-239210 A | 8/2003 |
| JP | 2003-252673 A | 9/2003 |
| JP | 2004-075489 A | 3/2004 |
| JP | 2004-076482 A | 3/2004 |
| JP | 2004-143019 A | 5/2004 |
| JP | 2004-169285 A | 6/2004 |
| JP | 2004-224680 A | 8/2004 |
| JP | 2004238862 A * | 8/2004 |
| JP | 2004-299965 A | 10/2004 |
| JP | 2004338957 A | 12/2004 |
| KR | 2005-0016033 A | 2/2005 |

* cited by examiner

WATER-RETAINABLE MOLDING AND METHOD FOR MANUFACTURING THE SAME

CROSS REFERENCE TO PRIOR APPLICATIONS

This is a U.S. national phase application under 35 U.S.C. §371 of International Patent Application No. PCT/JP2006/311172, filed May 30, 2006, which claims the benefit of Japanese Application No. 2005-158320, filed May 31, 2005, Japanese Application No. 2005-326110, filed Nov. 10, 2005, and Japanese Application No. 2005-326111, filed Nov. 10, 2005, all of which are incorporated by reference herein. The International Application was published in Japanese on Dec. 7, 2006 as International Publication No. WO 2006/129838 A1 under PCT Article 21(2).

TECHNICAL FIELD

The present invention relates to a water retainable molding and a method of manufacturing the same. More specifically, the present invention relates a water retainable molding which is used for an outer wall member and a roofing member of a building or house, or an exterior material such as an outer wall member, a roofing member, etc. or a coating member therefor, or a paving member for a road, a park, a parking area, etc., and absorbs and retains a supplied water content inside thereof, and evaporates the water content from the surface thereof, and a manufacturing method therefor.

RELATED ARTS

Examples of conventional water-retainable moldings are disclosed in Japanese Patent Application Laid-open No. 7-109165 (Patent Document 1) laid-open on Apr. 25, 1995, Japanese Patent Application Laid-Open No. 2001-158676 (Patent Document 2) laid-open on Jun. 12, 2001, and Japanese Patent Application Laid-Open No. 2004-299965 (Patent Document 3) laid-open on Nov. 28, 2004.

A fiber-reinforced cement hardened body in the Patent Document 1 is obtained by blending aggregate and reinforcing pulp fibers into cement.

A water-retainable concrete solidified body in the Patent Document 2 is obtained by including carbon dioxide with aggregate containing fine open cells, mixing the aggregate with cement to be hardened to form pores due to the carbon dioxide between the fine open cells and the surface.

A water-retainable porous concrete molding in the Patent Document 3 is formed by mixing and hardening cement and detritus of a wooden exterior member to form continuous massive spaces of the porous concrete, fine voids within the wooden exterior member, and capillary portions of the wooden member itself.

However, when water contents are supplied to the fiber-reinforced cement hardened body in the Patent Document 1, the water contents are absorbed in the reinforcing pulp fibers by a capillary effect, but the water absorbing speed is so low that most of the water contents cannot be absorbed in the reinforcing pulp fibers, and thus flow onto the surface of the fiber-reinforced cement hardened body. Thus, sufficient amounts of the water contents cannot be absorbed in the fiber-reinforced cement hardened body, and moreover, the water retaining amount of the fiber-reinforced cement hardened body becomes lessened. Consequently, even if the water content retained in the fiber-reinforced cement hardened body is evaporated from the surface, and the evaporation can suppress a rise of the surface temperature, the fiber-reinforced cement hardened body cannot maintain such an effect of suppressing the rise of the surface temperature.

In the water-retainable concrete solidified body in the Patent Document 2, the volume of each of the fine open cells in the aggregate is smaller in need for the strength of the aggregate, and thus the amount of the water content retained in the fine open cells becomes lessened. Furthermore, the thinner the pore is, the lesser the amount of the water content absorbed from the surface to the pore is. Thus, the water absorbing amount and the water retaining amount are lessened, so that the amount of the water content supplied from the fine open cells to the surface becomes less, making it impossible for the water-retainable concrete solidified body to maintain the rise of the effect of suppressing a surface temperature due to the evaporation.

On the other hand, if the pore is thicker than the fine open cell, the water content is retained in the fine open cell and cannot be suck up from the fine open cell to the pore by a capillary action, so that the water content cannot be supplied to the surface, making it impossible to produce the effect of suppressing the rise of the surface temperature by the evaporation.

In the water-retainable porous concrete molding in the Patent Document 3, when water contents reach to the fine voids and the capillary portions though the continuous massive spaces, the water contents are retained in the fine voids and the capillary portions by a capillary phenomenon. However, if the continuous massive space is thicker than the fine void and the capillary portion, the water contents cannot be sucked from the fine void and the capillary portion to the continuous massive space, so that the water contents cannot be supplied to the surface, making it impossible for the water-retainable porous concrete molding to produce the effect of suppressing the rise of the surface temperature by the evaporation.

SUMMARY OF THE INVENTION

Therefore, it is a primary object of the present invention to provide a novel water-retainable molding and a method of manufacturing the same.

The other object of the present invention is to provide a water-retainable molding capable of producing and maintaining an effect of suppressing a surface temperature rise and a manufacturing method therefor.

An invention according to the $1^{st}$ embodiment is a water-retainable molding that comprises: a platelike block which is made of a cement gel that is obtained by hardening cement and has a surface, a water-retaining portion formed in the platelike block, a capillary portion formed in the platelike block and extending from the water-retaining portion to the surface, and a water communicating opening portion formed inside the platelike block, extending from the water-retaining portion to the surface, and being thicker than the capillary portion.

In the invention according to the $1^{st}$ embodiment, a water-retainable molding (10: reference numeral designating a portion corresponding in the embodiments, and the same will be applied thereafter.) has a platelike block (12). The platelike block (12) is made of a cement gel (19) that is hardened cement, and the platelike block (12) is formed with a water-retaining portion (16), a capillary portion (22, 24, 32) and a water communicating opening portion (30). The capillary portion (22, 24, 32) and the water communicating opening portion (30) extend from the water-retaining portion (16) to the surface (18, 34) of the platelike block (12), and are opened on the surface (18, 34).

When a water content is supplied to the surface (18, 34), the water content flows into the capillary portion (22, 24, 32) and the water communicating opening portion (30) from the surface (18, 34) by an adhesive force to the capillary portion (22, 24, 32) and the communicating opening portion (30) and gravity, reaches to the water-retaining portion (16) through the capillary portion (22, 24, 32) and the water communicating opening portion (30), and is retained in the water-retaining portion (16). At a time of such the water absorption, the water content is absorbed in not only the capillary portion (22, 24, 32) but also the water communicating opening portion (30) thicker than the capillary portion (22, 24, 32), and therefore, the water-retainable molding (10) produces improved water absorption. Furthermore, the water content is retained in the water-retaining portion (16), and therefore, the water-retainable molding (10) has an improved water retentivity.

When radiation such as solar radiation, etc. impinges on the surface (18, 34), the water content on the surface (18, 34) is evaporated, and then, the water content retained in the capillary portion (22, 24, 32) below the surface is evaporated near the surface, and the water content retained in the water-retaining portion (16) is drawn through the capillary portion (22, 24, 32) by a capillary action and diffusion. Then, the water content is transferred toward the surface (18, 34) through the capillary portion (22, 24, 32) to be supplied to the surface (18, 34) and evaporated. As a result, most of the radiant energy is changed to latent heat of vaporization, so that the temperature of the surface (18, 34) does not rise, and therefore, the water-retainable molding (10) produces an effect of suppressing a surface temperature rise. In addition, the water-retaining portion (16) retains large amounts of water contents, which are successively supplied to the surface (18, 34). Thus, the water-retainable molding (10) can maintain the effect of suppressing the rise of the surface temperature.

An invention according to the $2^{nd}$ embodiment is the water-retainable molding according to the $1^{st}$ embodiment, wherein the surface includes a hydrophilic surface.

In the invention according to the $2^{nd}$ embodiment, the surface (18, 34) is made of a hydrophilic surface, so that when a water content retained inside the platelike block (12) passes through the capillary portion (22, 24, 32) and the water communicating opening portion (30), and is supplied from openings of each of them to the surface (18, 34), the water content spreads on the surface (18, 34) widely, thinly and rapidly. This makes a water evaporation area on the surface (18, 34) wide, and makes the evaporation speed high, and therefore, the water-retainable molding (10) has an improved evaporativity and effect of suppressing the rise of the surface temperature.

An invention according to the $3^{rd}$ embodiment is the water-retainable molding according to the $2^{nd}$ embodiment, wherein the hydrophilic surface includes concaves and convexes formed by inclined flat surfaces.

In the invention according to the $3^{rd}$ embodiment, if the hydrophilic surface (18, 34) is provided with concaves and convexes (34a), since the hydrophilic nature of the surface (18, 34) is further enhanced, the speed of the water content spreading over the surface (18, 34) becomes high, and the thickness of the water content moreover becomes thin. Furthermore, the concaves and convexes (34a) increases an area of the surface (18, 34), and enlarges the water evaporation area in the water-retainable molding (10). In addition, when the concaves and convexes (34a) are formed by flat surfaces (34b), the thickness of the water content expanded on the surface (18, 34) becomes even. As a result, the water-retainable molding (10) further improves the evaporativity and the effect of suppressing the rise of the surface temperature.

An invention according to the $4^{th}$ embodiment is the water-retainable molding according to the $1^{st}$ embodiment, wherein the capillary portion has a diameter thinner toward the surface.

In the invention according to the $4^{th}$ embodiment, the capillary portion (22, 24, 32) becomes thinner toward the surface (18, 34). The thinner the diameter of the capillary portion (22, 24, 32) is, the larger the adhesive force of the water content to the capillary portion (22, 24, 32) is with respect to the weight of the water content retained in the capillary portion (22, 24, 32), so that the water content moves to a thinner direction of the capillary portion, that is, to the surface (18, 34).

Thus, when the water content on the surface (18, 34) is evaporated, the water content retained in the capillary portion (22, 24, 32) near the surface (18, 34) flows and is supplied to the surface (18, 34) to be evaporated. Then, with the evaporation, the water content retained in the water-retaining portion (16) flows into the capillary portion (22, 24, 32), moves toward the thinner direction of the capillary portion (22, 24, 32), and is then supplied to the surface (18, 34) so as to be evaporated.

By making the capillary portion (22, 24, 32) thinner toward the surface (18, 34), the water content retained inside the platelike block (12) is guided to the surface (18, 34), and continuously flows through the capillary portion (22, 24, 32), so that the water content is always flown and supplied to the surface (18, 34). Thus, the water-retainable molding (10) produces a further improved effect of suppressing the rise of the surface temperature.

An invention according to the $5^{th}$ embodiment is a water-retainable molding according to any one of the $2^{nd}$ through the $4^{th}$ embodiments, and further comprises a fiber aggregate which is provided in the platelike block, made up of thin fibers and has internal spaces, and the capillary portion has voids formed between the thin fibers and the cement gel, the water-retaining portion includes the internal spaces of the fiber aggregate, and the water communicating opening portion includes voids formed between the adjacent fiber aggregates.

In the invention according to the $5^{th}$ embodiment, the fiber aggregate (14, 16) is made up of a large number of thin fibers (20, 26), and has internal spaces (22, 28) inside the fiber aggregate (14, 16). When the fiber aggregate (14, 16) is provided in the platelike block (12), voids (24) are formed between the thin fibers (20, 26) and the cement gel (19), and the voids (24) are employed as a capillary portion and the internal spaces (28) of the fiber aggregate (16) are employed as a water-retaining portion. Furthermore, voids (30) are formed between the adjacent fiber aggregates (16), and the voids (30) are employed as a water communicating opening portion.

Thus, the water-retainable molding (10) has water absorption, water retentivity and evaporativity, and can produce an effect of suppressing the rise of the surface temperature. Furthermore, by changing the shape, a compounded amount, a distribution, etc. of the fiber aggregate (14, 16), the size of the water-retaining portion can be increased, continuities of the capillary portion and the water communicating opening portion can be heightened, and a ratio of the cement gel (19) to the water-retainable molding (10) can be increased. Thus, a performance of suppressing a surface temperature and an intensity of the water-retainable molding (10) can be adjusted so as to be suited to its application.

An invention according to the $6^{th}$ embodiment is the water-retainable molding according to the $5^{th}$ embodiment, wherein each of the voids formed between the thin fibers and the cement gel is thinner than each of the voids formed between the adjacent thin fibers.

In the invention according to the 6th embodiment, the voids (24) between the thin fibers (20, 26) and the cement gel (19) are employed as a capillary portion, and the voids (28) between the thin fibers (26) in the internal spaces of the fiber aggregate (14, 16) are employed as a water-retaining portion.

Thus, when each of the voids (24) between the thin fibers (20, 26) and the cement gel (19) is thinner than each of the voids (28) between the adjacent thin fibers (26), the capillary portion thus becomes thinner than the water-retaining portion, and therefore, the water content in the water-retaining portion is drawn into the capillary portion by the capillary action.

Thus, when the water content on the surface (18, 34) is evaporated, the water content retained in the voids (28) between the adjacent thin fibers (20, 26) flows into the capillary portion (24), and is continuously supplied to the surface (18, 34) to be evaporated, and therefore, the water-retainable molding (10) can maintain the effect of suppressing the rise of the surface temperature.

An invention according to the 7th embodiment is a water-retainable molding according to any one of the 2nd through the 4th embodiments further comprising a fiber aggregate which is provided in the platelike block, made of thin fibers and has internal spaces, and a porous member having pores inside thereof and provided inside the platelike block, wherein the capillary portion includes voids formed between the thin fibers and the cement gel, the water-retaining portion includes the pores of the porous member, and the water communicating opening portion includes voids formed between the adjacent porous members.

In the invention according to the 7th embodiment, the porous member has pores inside thereof, and is provided in the platelike block (12) along with the fiber aggregate (14, 16). Thus, the capillary portion is formed at the voids (24) between the thin fibers (20, 26) and the cement gel (19), the water-retaining portion is formed at the pores of the porous member, and the water communicating opening portion is formed at the voids (30) between the adjacent porous members. Consequently, the water-retainable molding (10) has water absorption, water retentivity, and evaporativity, and can produce a performance of suppressing the rise of the surface temperature.

An invention according to the 8th embodiment is a water-retainable molding according to the 7th embodiment, wherein each of the voids formed between the thin fibers and the cement gel is thinner than each of the pores of the porous member.

In the invention according to the 8th embodiment, the voids (24) between the thin fibers (20, 26) and the cement gel (19) are utilized as a capillary portion, and the pores of the porous member are utilized as a water-retaining portion.

Thus, if each of the voids (24) between the thin fibers (20, 26) and the cement gel (19) is thinner than each of the pores of the porous member, the capillary portion becomes thinner than the water-retaining portion, so that the water content in the water-retaining portion is drawn into the capillary portion by the capillary effect. Thus, the water content retained in each of the pores of the porous member flows through the capillary portion (24), and is successively supplied to the surface (18, 34) to be evaporated. Consequently, the water-retainable molding (10) can maintain the effect of suppressing the rise of the surface temperature.

An invention according to the 9th embodiment is a water-retainable molding according to any one of the 6th through the 8th embodiments, and wherein a part of the fiber aggregate is exposed to the surface.

In the invention according to the 9th embodiment, the fiber aggregate (14, 16) is exposed to the surface (18, 34), so that if the water content is supplied from the capillary portion (22, 24, 32) and the water communicating opening portion (30) to the surface (18, 34), the water content spreads widely, thinly and rapidly on the surface (18, 34) along the fiber aggregate (14, 16) exposed to the surface (18, 34), and then is evaporated. Consequently, the water-retainable molding (10) has further improved evaporativity and effect of suppressing a surface temperature rise.

An invention according to the 10th embodiment is the water-retainable molding according to the 8th embodiment, and wherein the fiber aggregate includes any one of a fiber bundle made up of the thin fibers collected in a longitudinal shape and a fiber mass made up of the thin fibers collected in a rounded shape.

In the invention according to the 10th embodiment, the fiber bundle (14) extends long, so that the voids (24) between the fiber bundle (14) and the cement gel (19) and the internal space (22) of the fiber bundle (14) are mainly utilized as the capillary portion. Furthermore, the fiber mass (16) has a large space inside thereof, so that the internal space (28) is mainly utilized as the water-retaining portion, and the voids (30) between the adjacent fiber masses (16) are mainly utilized as the water communicating opening portion.

Thus, the water content supplied to the surface (18, 34) passes through the voids (30) between the adjacent fiber masses (16) into the platelike block (12), and retained in the internal space (28) of the fiber mass (16). Consequently, the water-retainable molding (10) has water absorption and water retentivity. Furthermore, when the water content is evaporated from the surface (18, 34), the water content retained in the internal space (28) of the fiber mass (16) is supplied to the surface (18, 34) through the voids (24) between the fiber bundle (14) and the cement gel (19) and through the internal space (22) of the fiber bundle. The water-retainable molding (10) also has evaporativity and a function of suppressing a rise of the surface temperature.

An invention according to the 11th embodiment is the water-retainable molding according to any one of the 5th through 10th embodiments, wherein the thin fiber includes rock wool.

In the invention according to the 11th embodiment, when the thin fibers (20, 26) are made of rock wool, the thin fibers (20, 26) hardly protrude from the surface (18, 34) of the platelike block (12), so that the surface (18, 34) is smoothed, capable of improving evaporativity and the function of suppressing the surface temperature rise of the water-retainable molding (10).

An invention according to the 12th embodiment is a water-retainable molding according to any one of the 5th through 10th embodiments, wherein the thin fiber includes cellulose fiber.

In the invention according to the 12th embodiment, cellulose has an amorphous region, so that the water content flows into and retained in the amorphous region of the cellulose as well as in the internal pores (22, 28) of the fiber mass (16) or/and fiber bundle (14), and therefore, the water retentivity of the water-retainable molding (10) is further improved.

An invention according to the 13th embodiment is a water-retainable molding according to any one of the first through 12th embodiments, wherein the cement includes at least one selected from a group including resin, portland cement, alumina cement and white cement.

In the invention according to the 13th embodiment, portland cement is available and low cost, and therefore, if the portland cement is applied to the platelike block (12), it is possible to produce the water-retainable molding (10) with ease and at low cost.

Alternatively, if alumina cement is applied to the platelike block (12), a thinner capillary portion (24, 32) is easy to be formed, and therefore, the water-retainable molding (10) has improved evaporativity and an effect of suppressing a surface temperature rise.

Still alternatively, if white cement is applied to the platelike block (12), the water-retainable molding (10) is whitened to enhance a reflection factor of the surface (18, 34), and therefore, it is possible to prevent a temperature rise of the water-retainable molding (10) from occurring.

An invention according to the 14th embodiment is a method of manufacturing a water-retainable molding including following steps of: (a) mixing cement and a fiber aggregate, and flowing it in a mold with an upper opening, and (b) hardening the cement to form a platelike block, and taking out it from the mold.

In the invention according to the 14th embodiment, when the cement and the fiber aggregate (14, 16) are mixed and hardened, the cement is hardened to produce a cement gel (19), and by the cement gel (19) the platelike block (12) is formed. Furthermore, in the platelike block (12), voids (24) are formed between the fiber aggregate (14, 16) and the cement gel (19) and voids (22) are formed between the adjacent thin fibers (20), and the voids (22, 24) are utilized as capillary portions. When the cement is hardened, a water content and air are discharged from the inside of the cement, so that a large number of fine pores (32) are formed in the platelike block (12), and the pores (32) are utilized as capillary portions. In addition, internal spaces (28) of the fiber aggregate (16) are formed in the platelike block (12), and the internal spaces (28) are utilized as water-retaining portions. Furthermore, voids (30) are formed between the adjacent fiber aggregates (14, 16), and the voids (30) are utilized as water communicating opening portions.

Thus, the water content supplied to the surface (18, 34) is absorbed inside the platelike block (12) through the water communicating opening portion (30) and the capillary portion (22, 24, 32), and retained in the water communicating opening portion (30), the capillary portion (22, 24, 32) and the water-retaining portion (16), and therefore, the water-retainable molding (10) has water absorption and water retentivity. On the other hand, when the water content is evaporated from the surface (18, 34), the water content retained in the fiber aggregate (16) reaches the surface (18, 34) through the capillary portion (22, 24, 32) to be evaporated, and therefore, the water-retainable molding (10) has evaporativity.

An invention according to the 15th embodiment is a water-retainable molding manufacturing method according to the 14th embodiment, wherein the step (a) includes a step (a1) of pressing the cement from above to smooth an upper surface of the platelike block.

In the invention according to the 15th embodiment, if pressure is applied to the mixture of the cement and the fiber aggregate (14, 16) from above, the capillary portion (22, 24, 32) is formed over the entire platelike block (12) to make the capillary portion (22, 24, 32) continuous in the platelike block (12), and therefore, the water-retainable molding (10) has evaporativity.

Furthermore, by the pressure from above, the capillary portion (22, 24, 32) is formed so as to narrow toward the surface (18, 34), and therefore, the water content retained in the fiber aggregate (16) continuously flows into the surface (18, 34), and therefore, the water-retainable molding (10) has improved evaporativity and effect of suppressing a rise of a surface temperature.

An invention according to the 16th embodiment is a water-retainable molding manufacturing method according to the 14th or 15 embodiment, wherein the step (b) includes a step (b1) of cutting an upper surface of the platelike block to form the upper surface as a surface having concaves and convexes.

In the invention according to the 16th embodiment, by the pressing the mixture of the cement and the fiber aggregate (14, 16), a ratio of the cement to the upper surface of the platelike block (12) becomes large, but if the upper surface of the platelike block (12) is cut, the capillary portion (22, 24, 32) and the water communicating opening portion (30) are opened on the surface (18, 34). Thus, when the water content is supplied to the surface (18, 34), large amounts of water contents flow from the respective openings of the capillary portion (22, 24, 32) and the water communicating opening portion (30), and therefore, the water-retainable molding (10) has improved water absorption. Furthermore, by cutting the surface, the concaves and convexes are provided on the surface (18, 34), and the fiber aggregate (14, 16) is exposed on the surface (18, 34), and therefore, when the water content is supplied from the capillary portion (22, 24, 32) and the water communicating opening portion (30) to the surface (18, 34), and the water content spreads widely, thinly, and rapidly on the surface (18, 34) so as to be evaporated, capable of improving evaporativity and an effect of suppressing the rise of the surface temperature of the water-retainable molding (10).

According to the present invention, since the water-retaining portion, the capillary portion extending from the water-retaining portion to the surface and the water communicating opening portion are provided in the platelike block, the water-retainable molding can produce and continue the effect of suppressing the rise of the surface temperature.

The above described objects and other objects, features, aspects and advantages of the present invention will become more apparent from the following detailed description of the present invention when taken in conjunction with the accompanying drawings

BEST MODE FOR PRACTICING THE INVENTION

Figure 1:
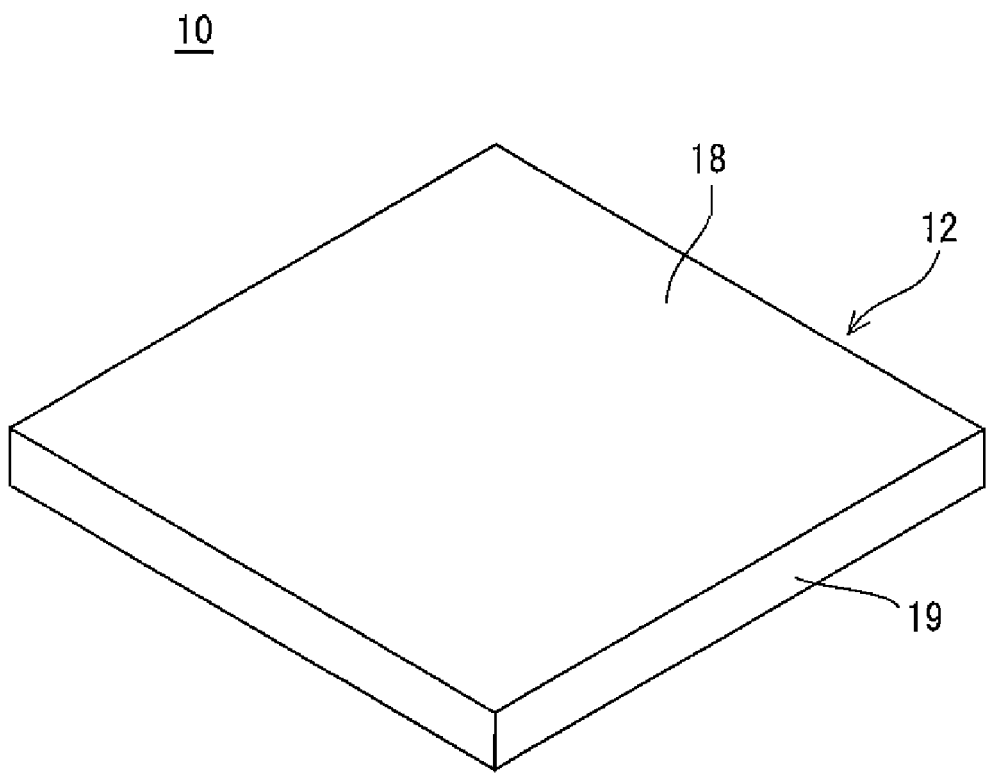
FIG. 1 is a perspective view showing a water-retainable molding of one embodiment of the present invention.

A water-retainable molding 10 of one embodiment of the present invention shown in FIG. 1 is manufactured by mixing cement and a fiber aggregate and hardening the cement, and has a platelike block 12, and a water-retaining portion, a capillary portion, and a water communicating opening portion which are formed inside the platelike block 12. Furthermore, the fiber aggregate includes fiber bundles 14 and fiber masses 16 shown in FIG. 2.

The platelike block 12 is a platelike body and has a surface 18 on its upper part. The size is set to 300 mm long and wide, and 30 mm high, for example.

Additionally, the platelike block 12 is made of a cement gel 19 of the hardened cement. The cement is a bonding member including organic and inorganic ones, and examples of the organic cement are synthetic resin, etc., and examples of the inorganic cement are clay, plaster, lime, magnesium oxychloride cement, portland cements, alumina cement, portland blast-furnace slag cement, sulfated slag cement, lime slag cement, silica cement, sulfate-resistant portland cement, etc. The inorganic cement gel 19 obtained by hardening the inorganic cement has a hydrophilic performance, and a high adhesive force of a water content to the cement gel 19 makes it easy for the water content to flow into a capillary portion and for a water content to be diffused on the surface 18, and therefore, it is fit for forming the platelike block 12. Out of the inorganic cement, the normal portland cement, the alumina cement and the white cement are superior in the following points. Here, the white cement is whitened by lessening iron oxide and magnesium oxide being a coloring component of the portland cement.

Generally, the portland cement is superior in availability because it is used in high amounts in many applications, and superior in cost efficiency because it is inexpensive. Moreover, the portland cement is generally white or pale color, which makes a surface reflection factor high and prevents a surface temperature rise due to solar radiation from occurring. Furthermore, the alumina cement can easily form a thin capillary portion by producing a dense composition, and the alumina cement has high corrosion resistance, heat resistance, low-temperature resistance, etc., so that the installation of location of the water-retainable molding 10 is hard to be restricted. In addition, since the color of the alumina cement is dark, by blending the alumina cement into the white cement, the water-retainable molding 10 is whitened to enhance the reflection factor of the surface 18. This makes it possible to suppress a surface temperature rise due to the solar radiation.

It should be noted that a single kind of cement may be used, but a plurality of kinds of cements can be mixed to be used, for the platelike block 12. Furthermore, additives can be blended with cement, and an example is to blend inorganic cement with an aggregate to produce concrete and mortar. In addition, the inorganic cement may be baked to produce ceramic.

Figure 3:
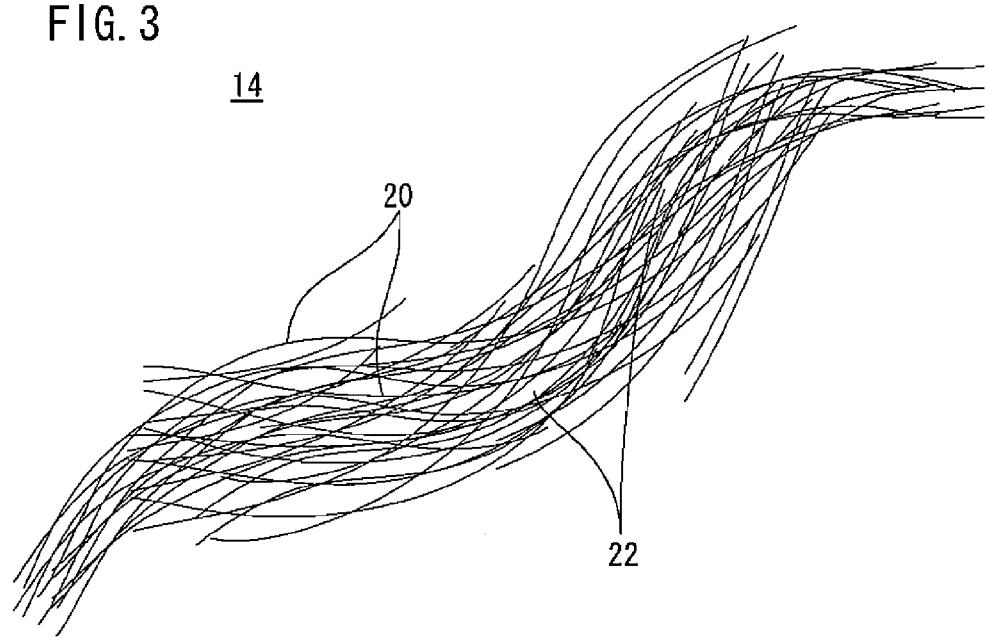
FIG. 3 is a plan view showing a fiber bundle utilized in the water-retainable molding.
Figure 4:
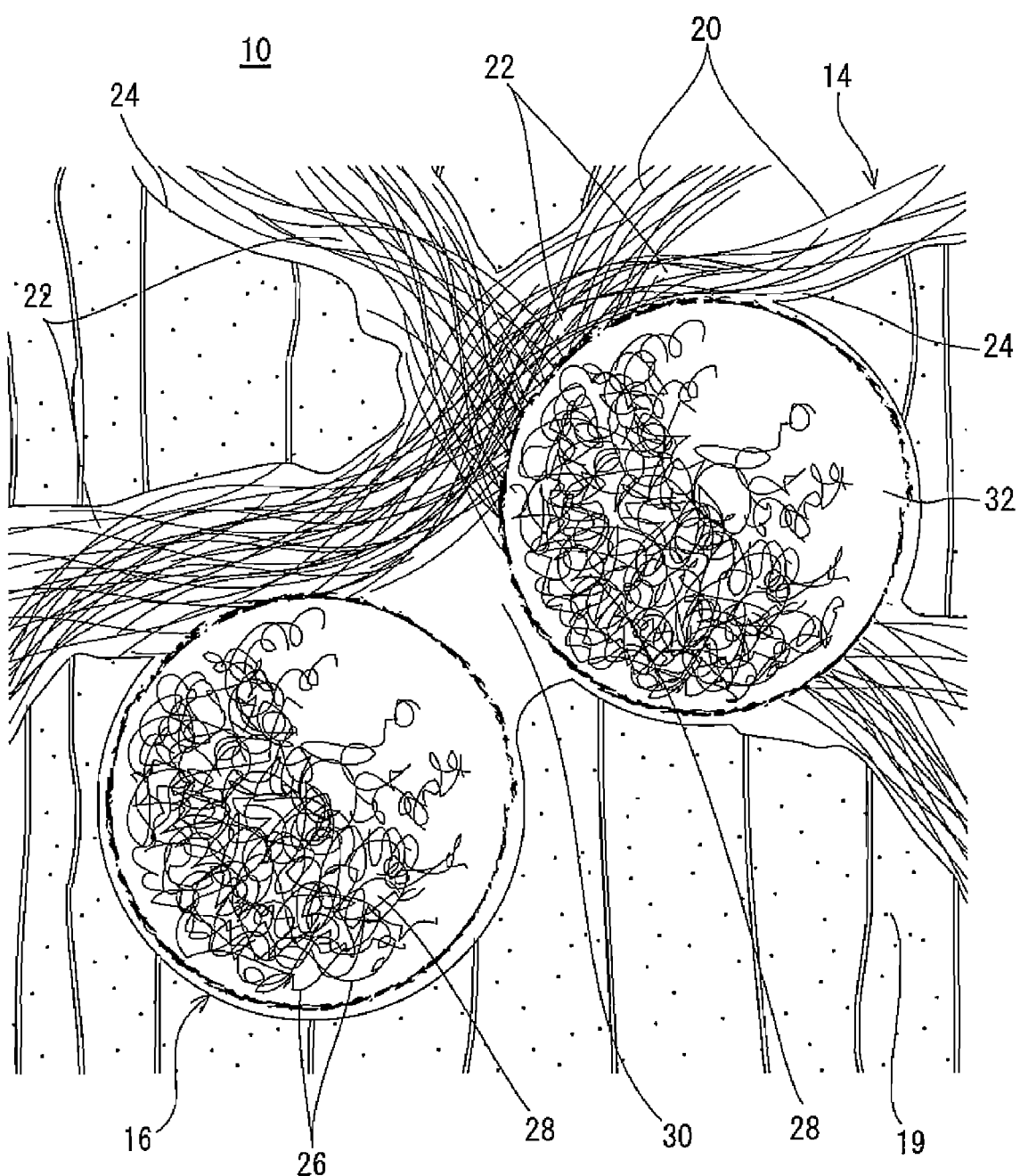
FIG. 4 is a grossly enlarged sectional view showing a part of the water-retainable molding.

A fiber bundle 14 is a continuous lengths extending long as shown in FIG. 3, and ties a large number of fine thin fibers 20 in a bundle. As shown in FIG. 4, the fiber bundles 14 are provided in the platelike block 12, but the fiber bundle 14 has internal spaces where the cement gel 19 does not flow into, and has a large number of first pores 22 in the internal spaces. The first pores 22 are fine voids between adjacent thin fibers 20, forms a part of the internal space of the fiber bundle 14, and are continuous within the fiber bundle 14.

Furthermore, the fiber bundle 14 and the thin fibers 20 are foreign substances contained in the platelike block 12, an adhesive force between the cement gel 19 and the thin fibers 20 is weak, and the large number of first pores 22 are contained in the fiber bundle 14, so that voids are formed between the fiber bundle 14 and cement gel 19 and between the thin fibers 20 and the cement gel 19. Second pores 24 are formed in these voids. The thickness of the second pore 24, that is, the space between the thin fiber 20 and the cement gel 19 is wider than the thickness of the first pore 22, that is, the space between adjacent thin fibers 20, and is formed so as to be equal to or less than 5 μm, for example.

When the fiber bundles 14 are brought into contact with each other, long extended continuous spaces are formed in the platelike block 12 such that the first pores 22 are continuous with each other, the second pores 24 are continuous with each other, and the first pores 22 and the second pores 24 are continuous with each other. Each of the continuous space extends to the surface 18 from the inside of the platelike block 12, and is opened on the surface 18.

Figure 2:
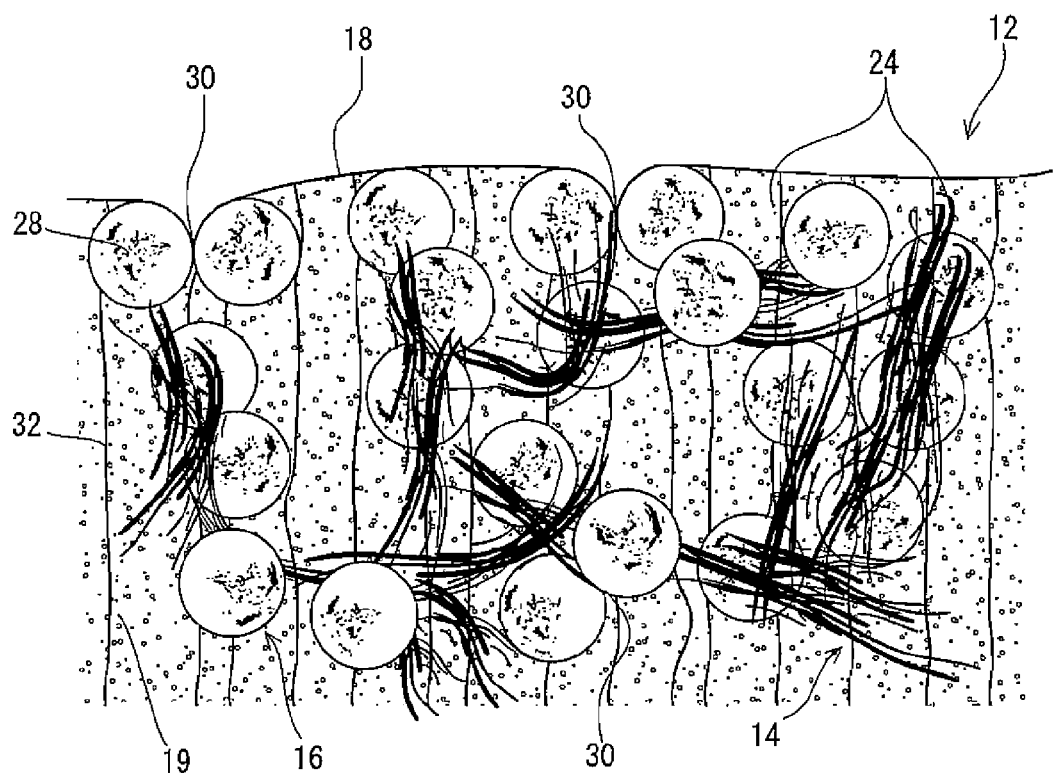
FIG. 2 is a cross-sectional view showing the water-retainable molding.

As shown in FIG. 2, a major part of the fiber bundle 14 is provided within the platelike block 12, but a part thereof is exposed over the entire surface 18, and spread along the surface 18. The exposed fiber bundle 14 includes the first pores 22, so that the first pores 22 are also extended on the surface 18 widely and long. Furthermore, the exposed fiber bundle 14 has fine grooves between the thin fibers 20 on its surface and fine grooves between the fiber bundle 14 and the cement gel 19, so that the fine grooves extend widely and long on the surface 18 as water conducting channels.

The thin fibers 20 include organic fibers or inorganic fibers, and examples of the organic fibers are plastic fibers and vegetable fibers. The vegetable fibers include fibers including cellulose, and the cellulose has an amorphous region where a water content can be retained. As the fibers including cellulose, there are pulp sludge, cotton, hemp, rayon, or the like, and the fibers can be extracted from plants, pulps, etc. by chemical or physical method.

In addition, the inorganic fibers include natural mineral fibers, man-made mineral fibers, etc. and the man-made mineral fibers include rock wool, slag wool, glass wool, ceramic wool, etc., and the most preferable of all is the rock wool in its availability and low cost. Rock wool is used having an average thickness equal to or less than 7 μm, length range of 0.1 to 200 mm, in which a representative value of the lengths being equal to or less than 50 mm.

Figure 5:
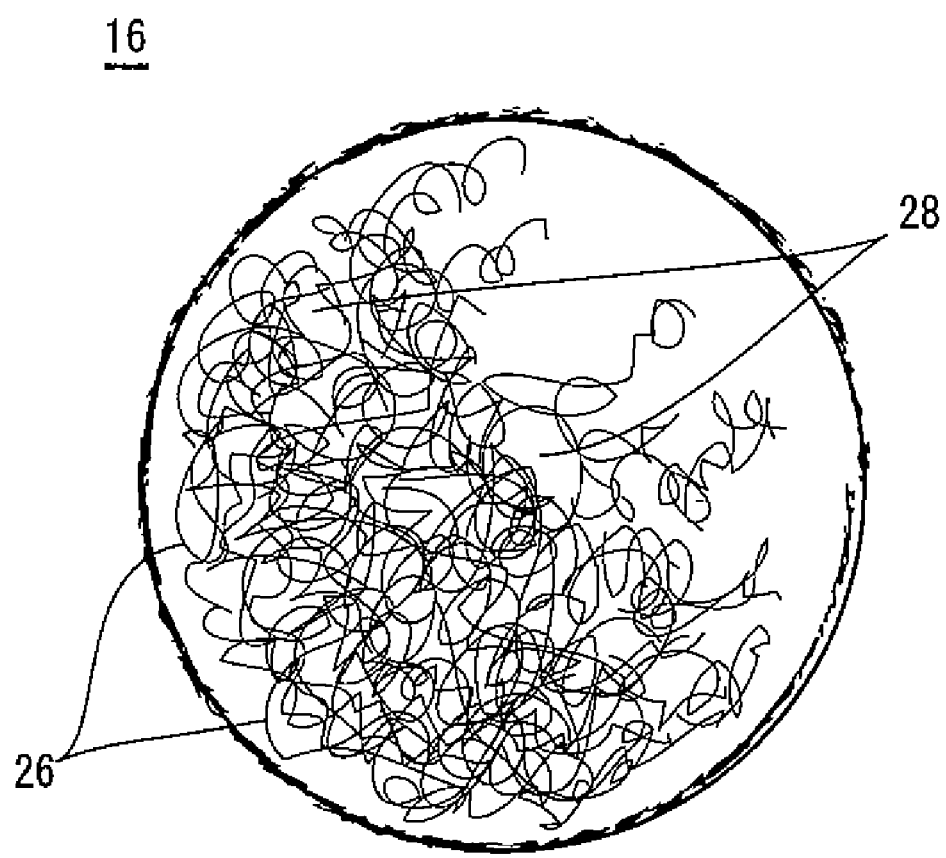
FIG. 5 is a plan view showing a fiber mass utilized in the water-retainable molding.

The fiber mass 16 is particulate matter rounded into a ball as shown in FIG. 5, and is formed by entwining a large number of thin fibers 26. As shown in FIG. 4, the fiber masses 16 are provided in the platelike block 12, but each has internal spaces where the cement gel 19 is not entered. By retaining a water content in the internal spaces, the fiber mass 16 is used as a water-retaining portion. Furthermore, the fiber mass 16 has a large number of third pores 28 within the internal spaces, and the third pores 28 are fine voids between the thin fibers 26, form a part of the internal spaces of the third pores 28, and is continuous in the fiber mass 16. Additionally, the thickness of the third pore 28, that is, the space between adjacent thin fibers 26 is thicker than that of the first and second pores 22, 24. Thus, the density of the thin fiber 26 forming the fiber mass 16 is smaller than that of the thin fibers 20 forming the fiber bundle 14.

When a fiber mass 16 is in contact with a fiber bundle 14 inside the water-retainable molding 10, the third pore 28 is continuous with the first and second pores 22, 24, so that the third pores 28 nearer to the first and second pores 22, 24 in the fiber mass 16 are continuous with each other, a third pore 28 and the surface 18 are continuous, and so forth. Also, when fiber masses 16 are in contact with each other inside the water-retainable molding 10, the third pores 28 are directly continuous with each other.

In addition, the fiber mass 16 and the thin fiber 26 are foreign substances included in the platelike block 12, and the large number of third pores 28 are provided inside the fiber mass 16, so that voids are formed between the fiber mass 16 and the cement gel 19 and between thin fibers 26 and the cement gel 19, and in these voids, second pores 24 are formed.

At a place where a large number of fiber masses 16 are locally close to each other, voids are formed between the adjacent fiber masses 16 without the cement gel 19 being entered, and fourth pores 30 are formed in the voids. The thickness of the fourth pore 30, that is, the space between the adjacent fiber masses 16 is larger than those of the first, the second and the third pores 22, 24, 28. Furthermore, when the space between the fiber masses 16 are connected by the fiber bundle 14 in the platelike block 12, since the fourth pores 30 are continuous with the first and second pores 22, 24, the fourth pore 30 are continuous with the third pores 28, with another fourth pore 30, or with the surface 18 by the first and second pores 22, 24. Thus the fourth pores 30 are continuous in the platelike block 12.

The particle diameter of the fiber mass 16 is not limited, but the particle diameters of the masses are preferably equal to each other, and particularly, the particle diameter of the order of 5-6 mm is more preferable. If the particle diameter is not equalized, a fiber mass 16 with a smaller particle diameter would fill in the space with a nearby fiber mass 16 and eliminates formation of a fourth pore 30, and a fiber mass 16 with an extremely large particle diameter would reduce strength of the water-retainable molding 10.

The thin fibers 26 employ materials the same as that of the thin fibers 20, and the fiber mass 16 can employ Rock Fiber #55R (manufactured by Nitto Boseki Co., Ltd.). It should be noted that the fibers 26 and the fibers 20 may be fibers in the same kind or in different kinds.

Furthermore, the ratio between a volume accumulating a volume of the fiber bundle 14 and a volume of the fiber mass 16 (hereinafter, referred to as "total volume of the fibers") and a volume of the platelike block 12 is determined such that the following three conditions are satisfied. The first condition is a ratio capable of entangling the large number of fiber bundles 14 with the large number of fiber masses 16. The second condition is a ratio allowing the fourth pores 30 to be formed between the large number of fiber masses 16. The third condition 3 is a ratio allowing the water-retainable molding 10 to have strength depending on the uses or applications of the water-retainable molding 10.

The ratio between the volume of the platelike block 12 and the total volume of the fibers is adequately determined depending on the kinds of the platelike block 12, the fiber bundle 14 and the fiber mass 16, etc. and a usage and a required performance of the water-retainable molding 10, etc. However, the ratio between the volume of the cement and the total volume of the fibers is preferably 2:8-8:2. This is because that an extremely low volume of the cement prevent a definite formation, so that the water-retainable molding 10 cannot be manufactured, whereas an extremely high volume of the cement prevents a continuous capillary portion from being formed in the platelike block 12, so that the water-retainable molding 10 cannot manufacture an effect of suppressing a surface temperature rise.

Furthermore, a ratio between the fiber bundles 14 and the fiber masses 16 is not specifically limited, but the volume of the fiber bundles 14 and the volume of the fiber masses 16 are equal to each other, or the volume of the fiber bundles 14 is less than the volume of the fiber masses 16.

As cited above, the platelike block 12 includes fifth pores 32 other than the first, second, third and fourth pores 22, 24, 28 and 30. The fifth pore 32 is formed by the cement gel 19, extends from the internal space of each of the fiber mass 16 and the fiber bundle 14 to the surface 18, and is thinner than the first-fourth pores 22, 24, 28, 30.

Thus, the platelike block 12 includes the first-fifth pores 22, 24, 28, 30, 32, and out of them, the first, second and fifth pores 22, 24 and 32, which extend from the fiber mass 16 to the surface 18, are mainly used as a capillary portion, and the fourth pore 30, which extends from the fiber mass 16 to the surface 18 and is thicker than the capillary portion, is mainly used as a water communicating opening portion. Here, the capillary portion is a space in which an adhesive force of a water content to the capillary portion, that is, an adhesion of the water content to the thin fibers 20 and the cement gel 19 is larger than the weight of the water content retained in the capillary portion, to raise water. Then, the water communicating opening portion is a space in which because it is thicker than the capillary portion, the weight of the water content retained in the water communicating opening portion is larger than an adhesive force to the water communicating opening portion, to lower the water. Furthermore, the third pores 28 are provided in the platelike block 12, and mainly used as a water-retaining portion. However, thinner ones out of the fourth pores 30 may mainly function as a capillary portion, and thicker ones out of the first, second and fifth pores 22, 24 and 32 function as a water communicating opening portion.

Furthermore, the first-fifth pores 22, 24, 28, 30, 32 are opened to the entire surface 18, and the large number of fiber bundles 14 and the large number of fiber masses 16 are exposed to the entire surface 18. When the plurality of fiber bundles 14 are in contact with each other on the surface 18, the first pore 22 is long continuous. Additionally, when the fiber bundle 14 exposed to the surface 18 is in contact with the openings of the first-fifth pores 22, 24, 28, 30, 32, the respective first-fifth pores 22, 24, 28, 30, 32 are continuous with the first pores 22 of the fiber bundle 14.

In the method of manufacturing the water-retainable molding 10, in a case that inorganic cement is used, fiber bundles 14 and fiber masses 16 are first immersed in water, and the fiber bundles 14 and the fiber masses 16 are mixed with inorganic cement, and the mixture is flown into a molding tool and dried. Then, the inorganic cement is hardened to become cement gel 19, and after a platelike block 12 is formed by the cement gel 19, it is taken out from the molding tool to finally produce the water-retainable molding 10.

In such a manufacturing method, when the inorganic cement is hardened, an unnecessary water content flows from the inorganic cement, and discharged to the outside of the platelike block 12 through the fiber bundles 14, the fiber masses 16 and the thin fibers 20 to thereby form voids between the cement gel 19 and the fibers 14, 16, 20. Also, the fiber bundles 14 and the fiber masses 16 include water contents and air inside thereof, so that the water contents and the air are also flown from the fiber bundles 14 and the fiber masses 16. The water is discharged to the outside of the platelike block 12 through the fibers 14, 16, 20, and the air is discharged to the outside of the platelike block 12 through the inorganic cement. The discharge of the water content forms voids between the cement gel 19 and the fibers 14, 16, 20, and the discharge of the air forms openings extending from the fibers 14, 16 to the surface 18 in the platelike block 12. In addition, the inorganic cement contracts more or less when it is hardened, and the fibers 14, 16, 20 are come off from the cement gel 19 to form voids between them. By the flow of the water content from the inorganic cement, the flow of the water content from the fiber bundles 14 and the fiber masses 16, and the contraction of the inorganic cement, the voids occurs between the cement gel 19 and the fibers 14, 16, 20, in which the second pores 24 are formed. Furthermore, by an emission of the air from the fiber bundles 14 and the fiber masses 16, voids occurs in the platelike block 12, in which the fifth pores 32 are formed.

Figure 6:
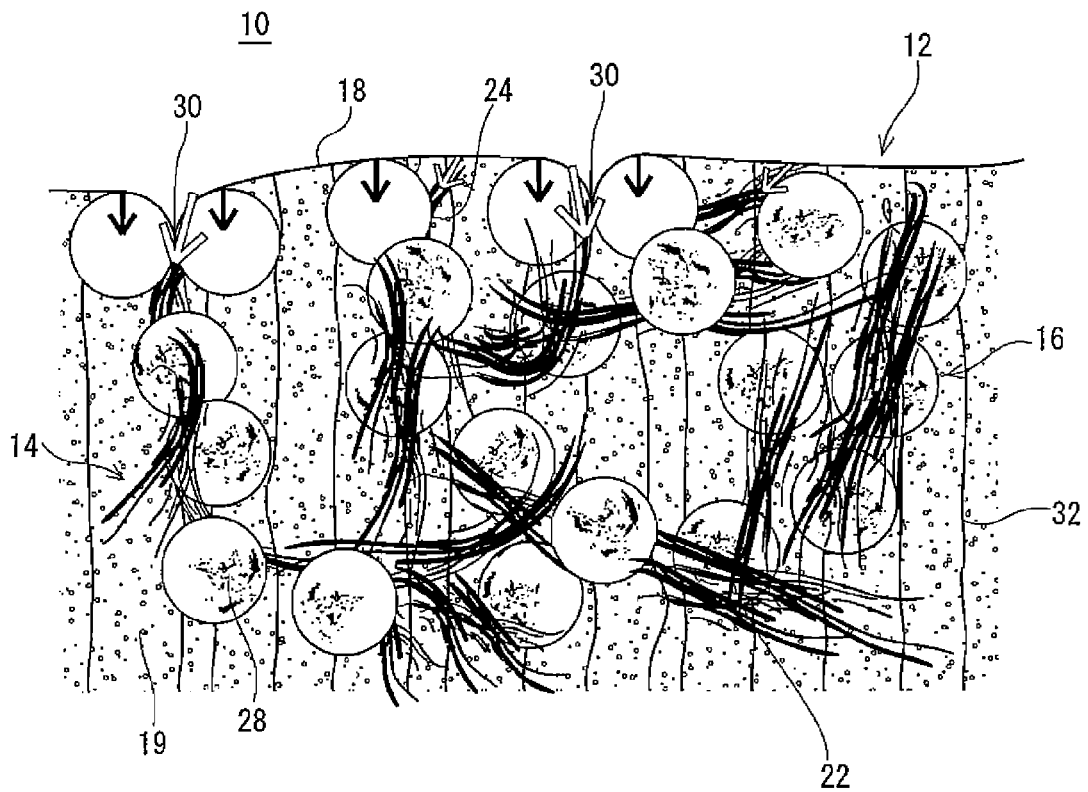
FIG. 6 is a cross-sectional view showing a state that a water content flows from openings of first to fifth pores to the respective pores.

When a water content is supplied to such a water-retainable molding 10, as shown in FIG. 6, the water content entered in the first pores 22 of the fiber bundle 14 exposed to the surface 18 and then reentered into the first-fifth pores 22, 24, 28, 30, 32 inside the platelike block 12, or entered into the first-fifth pores 22, 24, 28, 30, 32 inside the platelike block 12 from each of the openings on the surface 18. Thus, not only the water content is absorbed in the first, second and fifth pores 22, 24, and 32 by a capillary action and the gravity, but also the water content is absorbed in the thickest fourth pore 30 out of the pores and whereby, the water content is soon absorbed in the platelike block 12 without flowing out of the surface 18, so that the water-retainable molding 10 can absorb large amounts of water.

Figure 7:
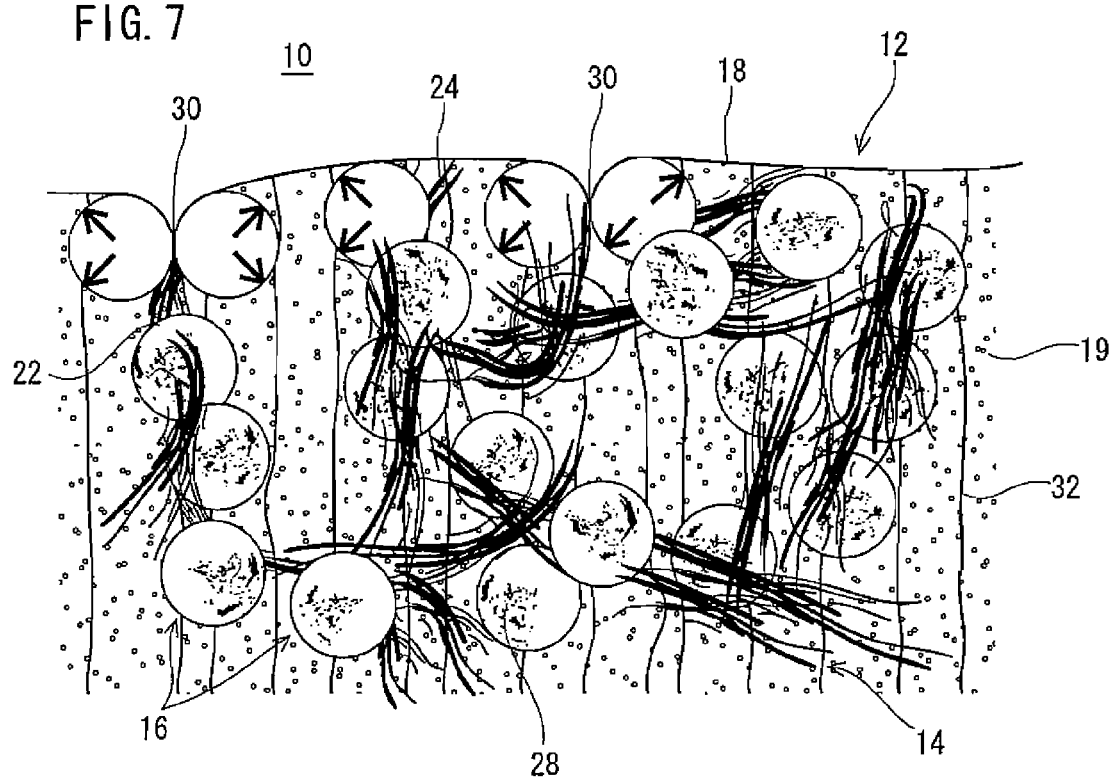
FIG. 7 is a cross-sectional view showing a state that a water content is diffused within fiber masses.

Succeedingly, the absorbed water content is flown into the third pores 28 adjacent to the respective pores 22, 24, 28, 32, and diffused to the third pores 28 in the entire fiber masses 16 by a capillary action as shown in FIG. 7. Thus, the water content is retained in the fiber masses 16 near the surface 18.

Figure 8:
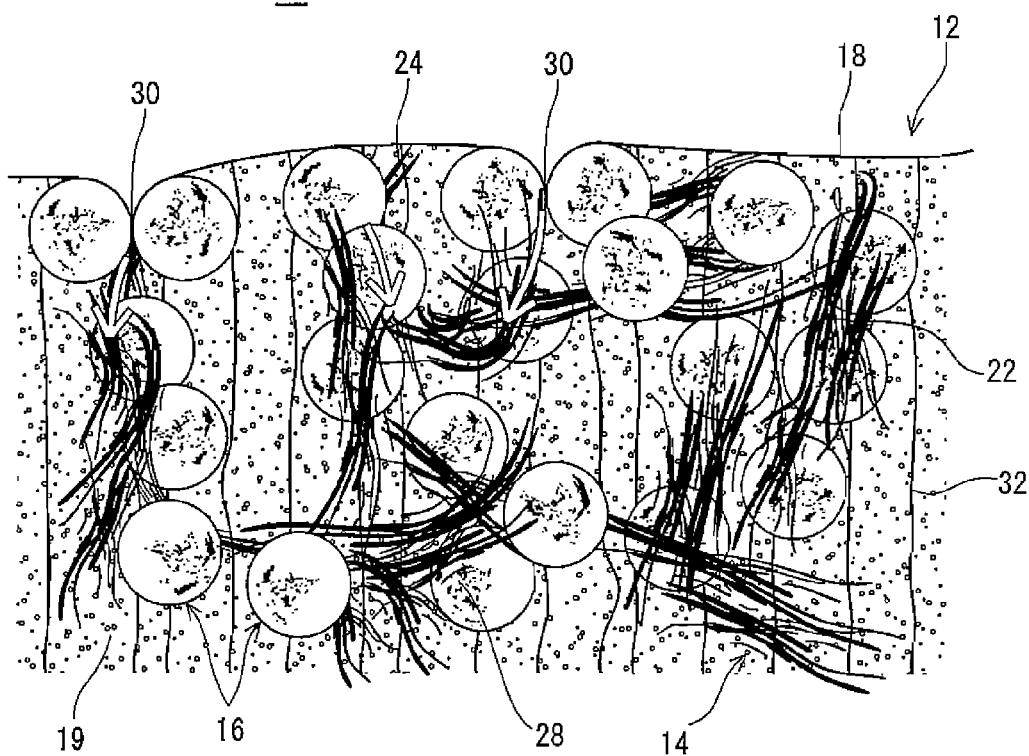
FIG. 8 is a cross-sectional view showing a state that a water content flows into a capillary portion.
Figure 9:
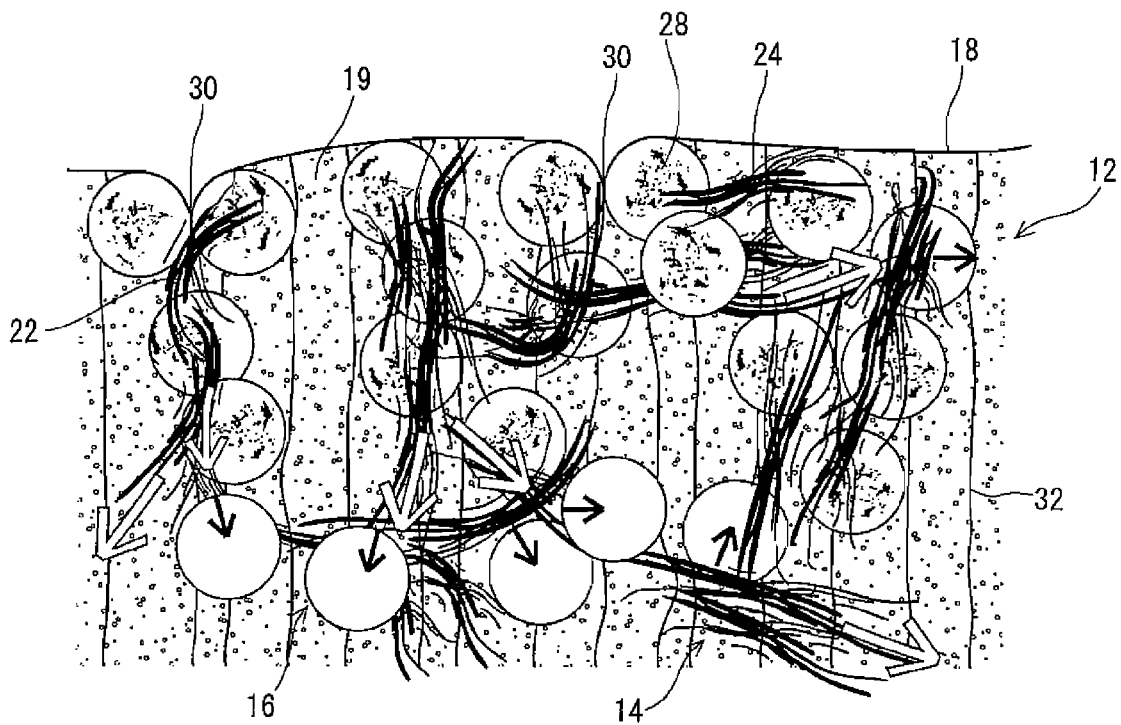
FIG. 9 is a cross-sectional view showing a state that a water content is transferred to the capillary portion.

Furthermore, the water contents of the fourth pores 30 are, as shown in FIG. 8, flown into the first, second and fifth pores 22, 24 and 32 by the capillary action and the gravity to be retained in the first, second and fifth pores 22, 24 and 32. According thereto, the water content, as shown in FIG. 9, flows into other fiber masses 16 through the first, second and fifth pores 22, 24 and 32, and flows into the fourth pores 30 in the platelike block 12. Thus, the water content is entered in depth of the water-retainable molding 10 by repeating such a transfer. Therefore, the water-retainable molding 10 can continue to absorb and retain large amounts of water contents in the fiber masses 16 having a large number of third pores 28, and is superior in water absorption and water retentivity.

In the water-retainable molding 10, the water content is retained in the fiber bundles 14 and the fiber masses 16 by a capillary action. Specifically, the first, second and fifth pores 22, 24 and 32 are thinner than the third and fourth pores 28 and 30, so that a phenomenon in which a water content is discharged from the lower part of the water-retainable molding 10 as gravitational water due to its own weight is suppressed, and the water-retainable molding 10 can continue to retain large amounts of water contents.

It should be noted that if fibers including cellulose is used in at least the thin fibers 20 and the thin fibers 26, a water content is retained in an amorphous region of the cellulose as well as the first-fifth pores 22, 24, 28, 30, 32, and the water content retained in the amorphous region is hard to be discharged as gravitational water, so that water retentivity of the water-retainable molding 10 is improved.

When the temperature of the surface 18 of the water-retainable molding 10 retaining large amounts of water contents rises due to reception of radiation such as solar radiation, the water content extended on the surface 18 is evaporated. At this time, when a water content retained in the first pores 22 of the fiber bundle 14 exposed to the surface 18 and a water content on the respective openings of the first-fifth pores 22, 24, 28, 30, 32 are evaporated, a water content retained in the first-fifth pores 22, 24, 28, 30, 32 lying under the evaporated water content rises by intermolecular forces and a capillary action, and is discharged from the respective openings to the surface 18.

When no water content is retained in the upper portion of the first, second and fifth pores 22, 24 and 32, a water content under it rises by a capillary action, and accordingly, a water content retained in the third and fourth pores 28 and 30 in the platelike block 12 flows into the first, second and fifth pores 22, 24 and 32 by a capillary action, is transferred to the surface 18 through the first, second and fifth pores 22, 24 and 32, and discharged to the surface 18 from the respective openings.

The water contents flowing through the openings move through the first pores 22 and the water conducting channels of the fiber bundle 14 which are exposed to the surface 18 by a capillary action. Thus, the water content is extended widely and rapidly on the entire surface 18, so that an evaporation area is widened, and the thickness of the extended water content is thin about 10 μm, for example, capable of increasing an evaporation speed of the water content. As a result, when the surface 18 is heated, the water content reached the surface 18 is rapidly evaporated, and a temperature rise on the surface 18 can be suppressed by heat of vaporization due to the evaporation.

By making use of a fine effect of suppressing a surface temperature rise of the water-retainable molding 10, the water-retainable molding 10 can be used as measures against a heat-island phenomenon.

Furthermore, the platelike block 12 is formed with the first-fifth pores 22, 24, 28, 30, 32 in advance, and in which a water content is accumulated, so that a water-retaining portion is not expanded to destroy the platelike block 12 due to the water absorption. Specifically, when large amounts of water contents are accumulated in an amorphous region of cellulose, the volume of platelike block 12 is more or less increased, but the increase in volume is mitigated by the first-fifth pores 22, 24, 28, 30, 32, so that reduction in the strength of the platelike block 12 due to the water absorption can be suppressed. Thus, it is possible for the water-retainable molding 10 to have fine durability.

In addition, since the fiber bundles 14, the fiber masses 16 and the cement can easily be changed in shape until hardened, not only they can make the water-retainable molding 10 to take shape of a definite shape such as a plate, a block, etc. but also they can be applied to pave on a rooftop or a wall by directly spraying.

Figure 10:
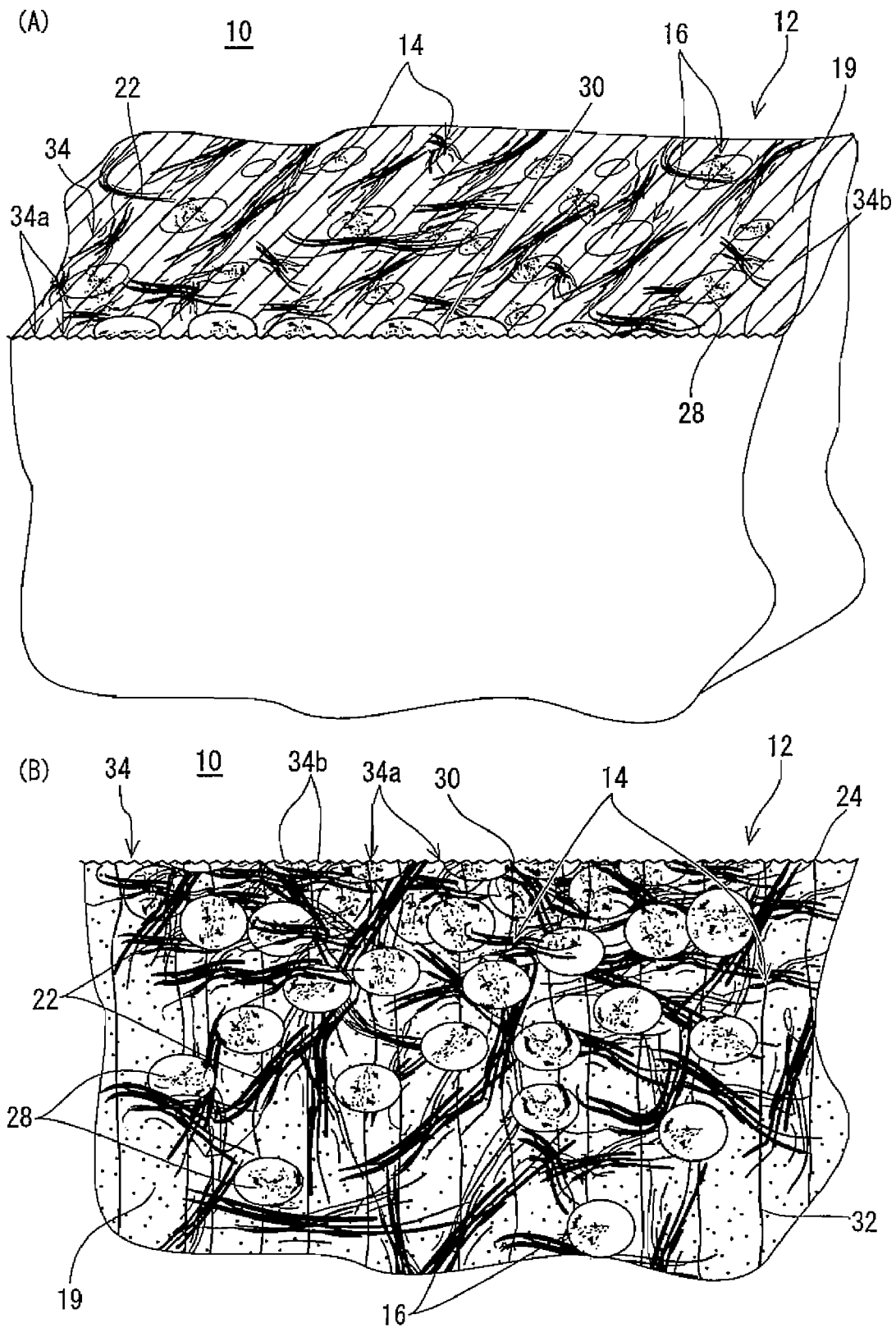
FIG. 10(A) is a perspective view showing a surface side of a water-retainable molding in another embodiment of the present invention.
FIG. 10(B) is a cross-sectional view showing a part of the water-retainable molding in FIG. 10(A)

A water-retainable molding 10 in another embodiment of the present invention shown in FIG. 10(A) and FIG. 10(B) is substantially the same as the water-retainable molding 10 shown in FIG. 1. However, the water-retainable molding 10 shown in FIG. 1 is manufactured by mixing and hardening cement, a large number of fiber bundles 14 and a large number of fiber masses 16, whereas the water-retainable molding 10 shown in FIG. 10(A) and FIG. 10(B) is different in that is formed by mixing cement, a large number of fiber bundles 14 and a large number of fiber masses 16, hardening the mixture with pressure from above, and cutting the surface thereof. Since the part except for this is the same as the water-retainable molding 10 shown in FIG. 1 embodiment, a description as to a common part will be omitted.

As shown in FIG. 10(A) and FIG. 10(B), the fiber bundles 14 extending to the surface 34 in the platelike block 12 are inclined to the surface 34 near the surface 34 so as to be parallel or approximately parallel thereto. The density of the fiber bundles 14 included per unit volume of the water-retainable molding 10 is increased toward the surface 34. Thus, many fiber bundles 14 are exposed and extended on the surface 34.

Figure 11:
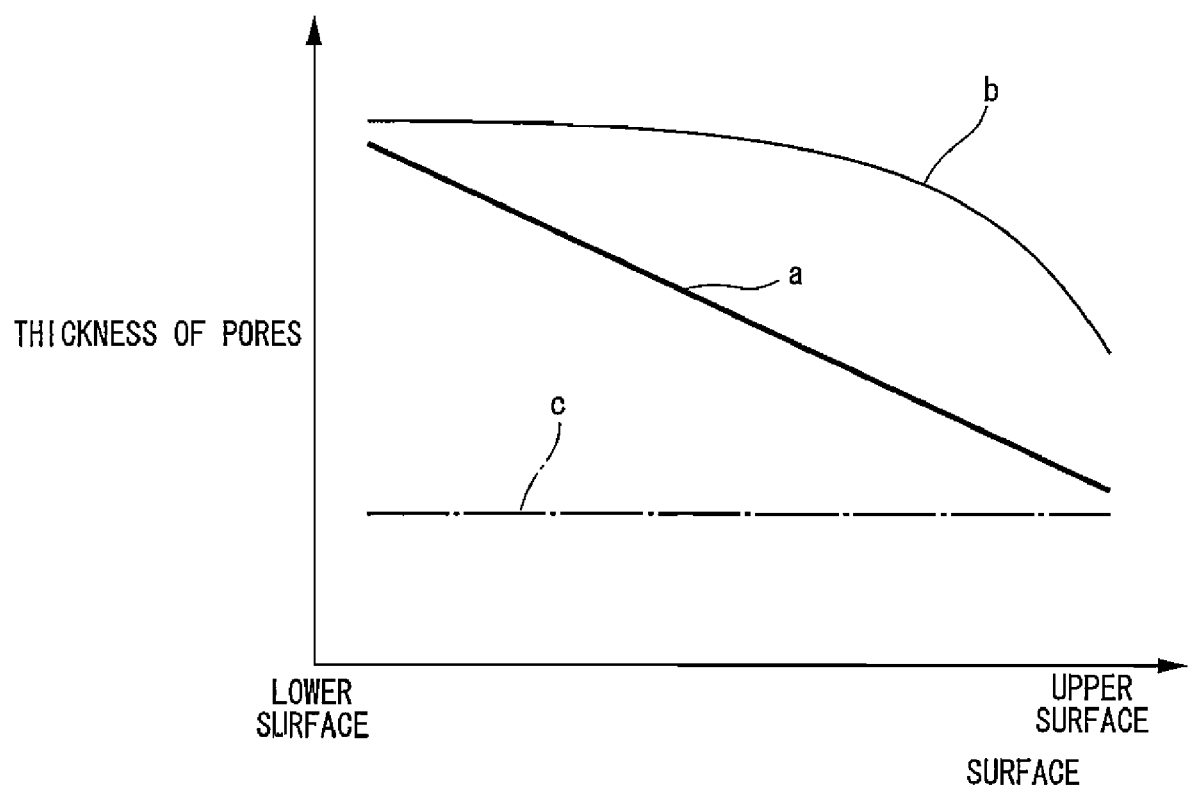
FIG. 11 is an illustrative view showing a thickness of a pore.

The thickness of each of the first, second and fifth pores 22, 24 and 32 is formed to narrow with approach towards the surface 34 from the lower surface of the platelike block 12 like the graph a shown in FIG. 11. Thus, as the first pore 22 is thinner, that is, as the first pore 22 approaches the surface 34, the density of the fiber bundles 14 per unit volume of the water-retainable molding 10 is high.

Furthermore, as shown in the graph a in FIG. 11, since the thickness of the third pore 28 gradually narrows with approach towards the surface 34 from the lower surface of the platelike block 12, the density of the fiber masses 16 per unit of volume of the water-retainable molding 10 is increased. Additionally, a fiber mass 16 which is nearer to the surface 34 is deformed in a elliptical shape, so that the density of the thin fibers 26 forming the fiber mass 16 is increased with approach towards the surface 34 from the lower surface of the platelike block 12.

Figure 12:
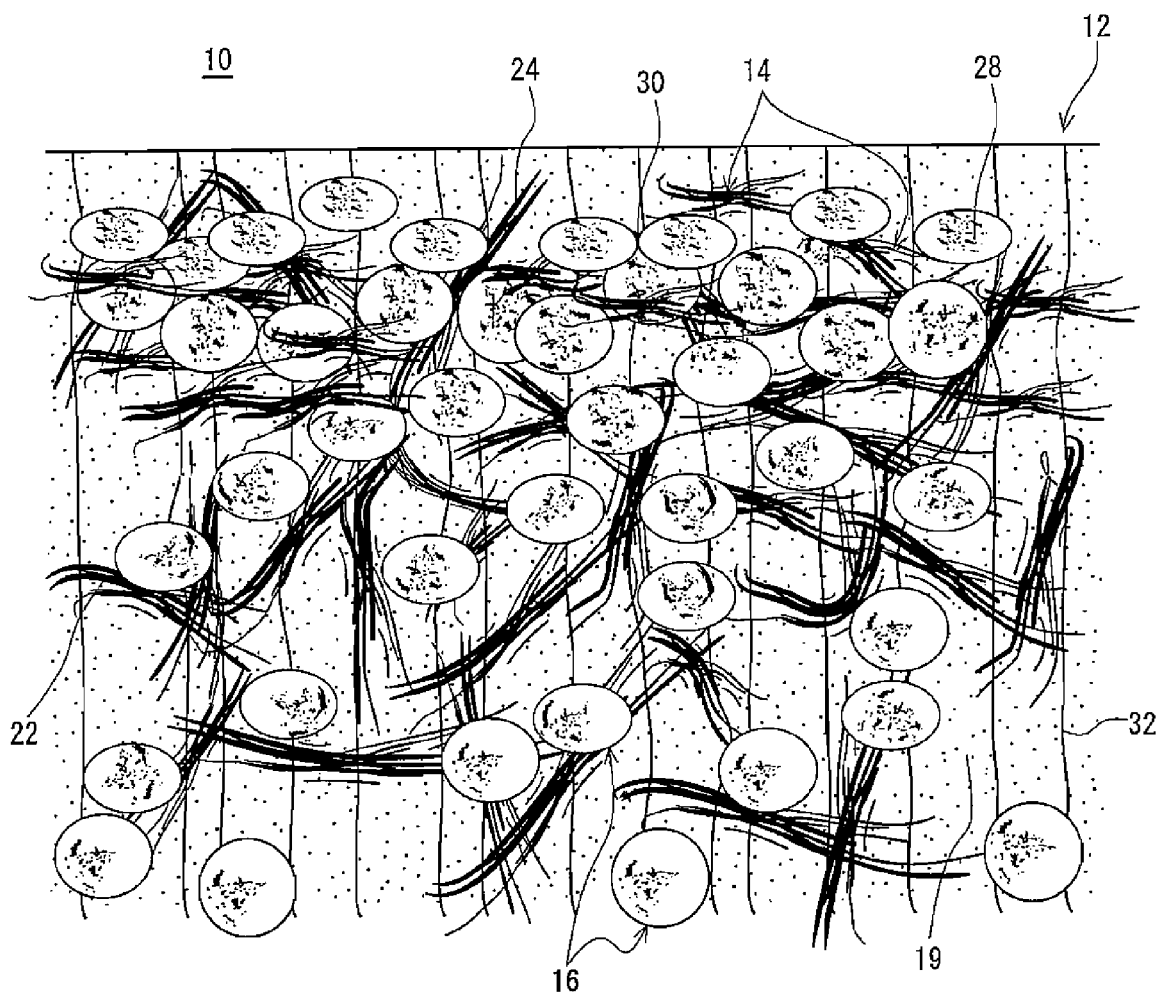
FIG. 12 is a cross-sectional view showing a mixture obtained by mixing and hardening fiber bundles, fiber masses and cement.

As shown in FIG. 10(A), the surface 34 is obtained by mixing the large number of fiber bundles 14, the large number of fiber masses 16 and the cement, and cutting the upper surface of the mixture shown in FIG. 12. For the cutting of the upper surface, a wire brush, a knife, a rasp, an abrasive agent, etc are utilized.

Figure 13:
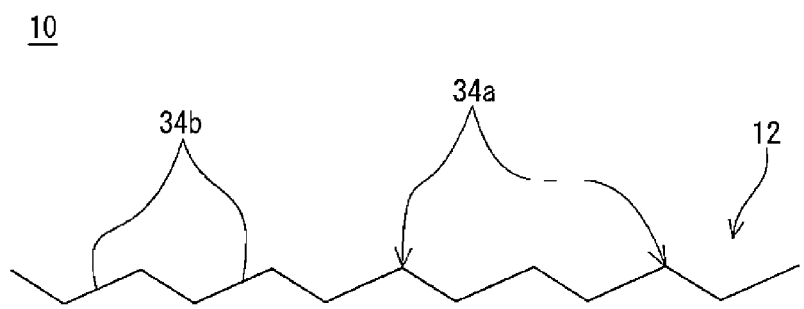
FIG. 13 is a grossly enlarged sectional view showing a part of a surface formed with a large number of fine concaves and convexes.

As shown in FIG. 10(A) and FIG. 10(B), the surface 34 is provided with a large number of fine concaves and convexes 34a on the entire surface, and the fine concaves and convexes 34a linearly extend in one direction, and are formed by grooves and corrugations in a direction orthogonal thereto. Due to the large number of fine concaves and convexes 34a, the surface 34 is a rough surface, but owing to flat surfaces 34b of the concaves and convexes 34a as shown in FIG. 13, the surface forming concaves and convexes 34a is flat or approximately flat. As shown in FIG. 10(A), FIG. 10(B) and FIG. 13, there is no appreciable hole of the opening inside the planar surface 34b, and the thin fibers 20 and thin fibers 26 are scarcely protruded from the flat surface.

The depth of the fine concaves and convexes 34a is set to 1-2 mm, for example, and the pitch of the concaves and convexes 34a corresponds to one over tens to one over hundreds of the size of the fiber mass 16, and set to 1-2 mm. Owing to the concaves and convexes 34a, the area of the surface 34 is increased, so that the evaporation area of the water-retainable molding 10 is enlarged.

Furthermore, since the concaves and convexes 34a are extremely fine, for a platelike block 12 using cement with a hydrophilic nature, owing to the fine concaves and convexes 34a, the hydrophilic nature of the surface 34 is enhanced. That is, if cement made of hydrophilic material such as typical portland cement and alkaline cement, etc. is used, a flat surface 34 has a hydrophilic nature, and the contact angle of a water droplet with respect to the surface 34 is below an angle of 90 degrees. When the fine concaves and convexes 34a are provided on the surface 34 with the hydrophilic nature, the apparent contact angle of a water droplet with respect to the surface 34 is smaller than a contact angle with respect to the planar surface 34, and a water content is easily spread widely and thinly on the surface 34.

When a water content is supplied to such a water-retainable molding 10, the water content absorbed and retained inside the platelike block 12 as in the water-retainable molding 10 shown in FIG. 1, and the water-retainable molding 10 produces a superior water absorption and water retentivity.

On the other hand, when the temperature of the surface 34 of the platelike block 12 with large amounts of water contents rises, since a water content flows from the platelike block 12 to the surface 34 to be evaporated as in the water-retainable molding 10 shown in FIG. 1, and therefore, the water-retainable molding 10 produces an effect of suppressing the rise of the surface temperature.

It should be noted that as shown in FIG. 10(B), since the thickness of each of the first, second and fifth pores 22, 24 and 32 narrows with approach towards the surface 34 from the lower surface of the platelike block 12, when a water content near the surface 34 of the first, second and fifth pores 22, 24 and 32 is evaporated, a water content inside the platelike block 12 flows into a narrow direction of each of the first, second and fifth pores 22, 24 and 32.

More specifically, if the first, second and fifth pores 22, 24 and 32, that is, capillary portions extend in a vertical direction, a strength of drawing up the water content retained in the capillary portion is obtained by the product of the surface tension of a water content by a capillary action and a length of a periphery of the water surface. On the other hand, a strength of pulling the water content is obtained by the product of the weight of the drawn water content, that is, the volume and the density thereof and a gravitational acceleration. Thus, if the surface tension and the density of the water content retained in the capillary portion are the same, as the capillary portion is narrow, the strength of drawing up the water content is greater than the weight of the water content. As a result, the water content retained in the capillary portion flows into a narrowing direction of the capillary portion.

Then, the water content flowing to the narrow direction of the first, second and fifth pores 22, 24 and 32 is transferred to the surface 34 through the first, second and fifth pores 22, 24 and 32, and discharged to the surface 34 from the respective openings.

Next, as shown in FIG. 10(A), since the concaves and convexes 34a having a high hydrophilic nature are provided on the surface 34, the water contents flown from the respective openings spread widely and rapidly on the surface 34. Furthermore, the water contents from the respective openings move the first pores 22 and the water conducting channels in the fiber bundle 14 exposed to the surface 34 by a capillary action, and spread widely and rapidly along the fiber bundles 14 being in contact with the surface 34 in the direction of expanding the fiber bundle 14 on the surface 34.

Therefore, wide and rapid spread of the water contents on the surface 34 makes the evaporation area larger. Moreover, thinness of the spread water contents increases the evaporation speed of the water contents. As a result, when the surface 34 is heated, the water content reached to the surface 34 is rapidly evaporated, and by the heat of vaporization by the evaporation, a temperature rise on the surface 34 can be suppressed.

Here, in a case that an opening or large recess is formed on each surface being made up of the concaves and convexes 34a, even if a water content spreads on the entire surface 34 thinly and widely, the thickness of the water content is increased within the recess. The evaporation area with respect to the volume of the water content here is small, so that the evaporation speed becomes low, and the water content is heated until being evaporated. Thus, it is impossible for the water-retainable molding 10 to exert an effect of suppressing the rise of the surface temperature. However, by making the inclined surface being made up of the concaves and convexes 34a flat, the thickness of a water content expanded on the surface 34 is substantially even, so that the water content is evaporated until the water content is heated. Thus, it is possible for the water-retainable molding 10 to impart a fine effect of suppressing the rise of the surface temperature.

Then, as shown in FIG. 10(A), since the size of each of the first, second and fifth pores 22, 24 and 32 narrows with approach towards the surface 34 from the lower surface of the platelike block 12, with the evaporation of the water content on the surface 34, the water content retained in the platelike block 12 is sequentially supplied to the surface 34 along the first, second and fifth pores 22, 24 and 32 on the surface 34 to be repeatedly evaporated. Thus, it is possible to maintain an effect of suppressing the surface temperature rise of the water-retainable molding 10 for a long time.

Figure 14:
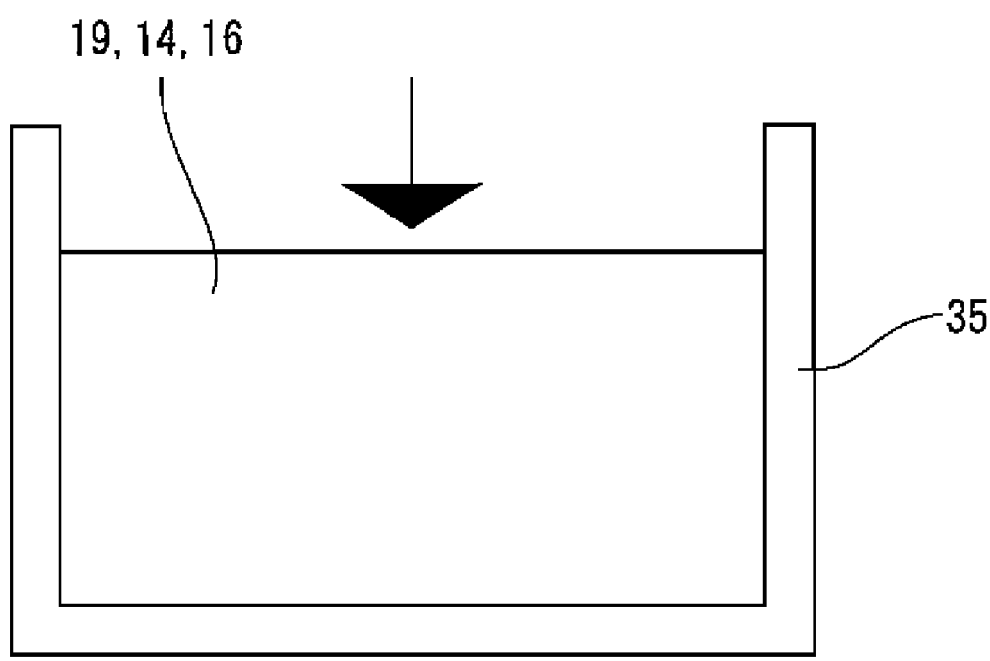
FIG. 14 is a cross-sectional view showing a state that a mixture of fiber bundles, fiber masses and cement is flown into a molding tool and is applied with pressure from above.

For manufacturing the water-retainable molding 10, in a case of using inorganic cement, fiber bundles 14 and fiber masses 16 are first immersed in the water to mix the fiber bundle 14 and fiber mass 16 with the inorganic cement and the water, the mixture is flown into a molding tool 35 with an upper opening shown in FIG. 14, and a pressure is then applied to the upper surface of the mixture before the inorganic cement is hardened. After the hardening of the inorganic cement forms cement gel 19 to allow the platelike block 12 to take a definite shape, it is taken out from the molding tool 35. Then, the surface of the platelike block is cut to form a cut surface 34, and consequently, the water-retainable molding 10 shown in FIG. 10(A) and FIG. 10(B) is completed.

In manufacturing the water-retainable molding 10, the mixture is pressed from above, and by the pressure on the entire platelike block 12, the thickness of each of the first, second and fifth pores 22, 24 and 32 narrows, and most of the first, second and fifth pores 22, 24 and 32 act as capillary portions. Thus, the capillary portions are widely continuous in the platelike block 12.

Furthermore, the pressure is large with approach towards the surface of the mixture in the molding tool 35. Thus, in the completed water-retainable molding 10, fiber bundles 14 and fiber masses 16 nearer to the surface 34 are compressed, and as shown in the graph a in FIG. 11, the thicknesses of the respective first, second and fifth pores 22, 24 and 32 narrow with approach towards the surface 34 from the lower surface of the platelike block 12.

It should be noted that when an excessive small pressure is applied to the mixture, the first, second and fifth pores 22, 24 and 32 narrow at only the shallow range from the surface 34 of the platelike block 12 as shown in the graph b in FIG. 11. Thus, in the vicinity of the surface 34 of the platelike block 12, the narrowness of the first, second and fifth pores 22, 24 and 32 nearer to the surface 34 allows the water content retained in the first, second and fifth pores 22, 24 and 32 to move in a narrowing direction of the first, second and fifth pores 22, 24 and 32 by a capillary action. However, since the first pore 22 does not narrow below them, the water content retained in the first, second and fifth pores 22, 24 and 32 which do not narrow accumulated there without moving to the surface 34. Thus, even if the surface 34 is heated, the water content amount evaporated from the surface 34 is decreased, an effect of suppressing the rise of the surface temperature of the water-retainable molding 10 by the evaporation is not exerted, and moreover, the temperature of the water content retained in the platelike block 12 rises. This results in a temperature-keeping action by the water-retainable molding 10.

On the other hand, when an excessive large pressure is applied to the mixture, as in the graph c shown in FIG. 11, the thicknesses of the first pores 22 uniformly narrows in the platelike block 12 entirely. In this case, a force of drawing up the water content retained in the first pore 22 to a narrowing direction of the first pore 22 by the capillary action is not worked, so that the water content is left there. Thus, the water-retainable molding 10 does not produce an effect of suppressing a surface temperature rise, resulting in occurrence of a temperature-keeping action instead.

Furthermore, when an excessive large pressure is applied to the mixture, the adjacent fiber masses 16 shown in FIG. 10(B) are close to each other to narrow the space between the adjacent fiber masses 16, which prevents the fourth pores 30 from being formed. This reduces the number of fourth pores 30 opened on the surface 34 and the amount of the water content drawn therefrom, resulting in reduction in water absorption and water retentivity, and by extension evaporativity of the water-retainable molding 10.

Consequently, the pressure applied to the upper surface of the mixture in the molding tool 35 is set such that the thickness of the first pore 22 narrows with approach towards the surface 34 and the number of fourth pores 30 is not lessened.

Additionally, when a pressure is applied to the mixture from above, the fiber masses 16 and the fiber bundles 14 are compressed to cause cement with high fluidity to move to the upper portion of the mixture, so that the ratio of the cement gel 19 to the portion closer to the surface 34 of the water-retainable molding 10 becomes high. Furthermore, since the respective pores being closer to the surface 34 of the water-retainable molding 10 become thin, when the upper surface of the mixture is cut, the openings 22, 24, 28, 32 of the respective pores on the surface 34 become smaller. As a result, a large hollow is not formed on the surface 34*b* forming the concaves and convexes 34*a*, and the surface 34*b* becomes flat to thereby allow the water content to spread thinly and widely on the surface 34. Thus, evaporativity and an effect of suppressing the rise of the surface temperature of the water-retainable molding 10 become high.

When a ratio of the cement gel 19 to the portion being closer to the surface 34 of the water-retainable molding 10 is high, the respective first-fifth pores 22, 24, 28, 30, 32 are hard to be opened on the surface 34, but by cutting the upper surface of the mixture, the openings of the first-fifth pores 22, 24, 28, 30, 32 can surely be formed on the surface 34 by the plurality of numbers. Thus, the water content from the platelike block 12 is discharged from the openings and evaporated, and therefore, it is possible to improve evaporativity and an effect of suppressing the rise of the surface temperature of the water-retainable molding 10.

It should be noted that although the fiber bundles 14 are exposed over the entire surface 34 in all the above-described embodiments, the fiber bundles 14 may be exposed to a part of the surface 34.

Furthermore, in the above-described embodiments, a large number of fine concaves and convexes 34*a* are provided on the entire surface 34, but fine concaves and convexes 34*a* may be provided at a part of the surface 34. The fine concaves and convexes 34*a* linearly extend in one direction and are formed by grooves and corrugations in a direction orthogonal thereto, but the shape of the concaves and convexes 34*a* is not limited thereto. For example, the concaves and convexes 34*a* can be formed by protrusions repeated in the orthogonally cross directions. Then, the fine concaves and convexes 34*a* may not be formed by repetition of the same shape, and may not be formed at equally spaced intervals.

Figure 15:
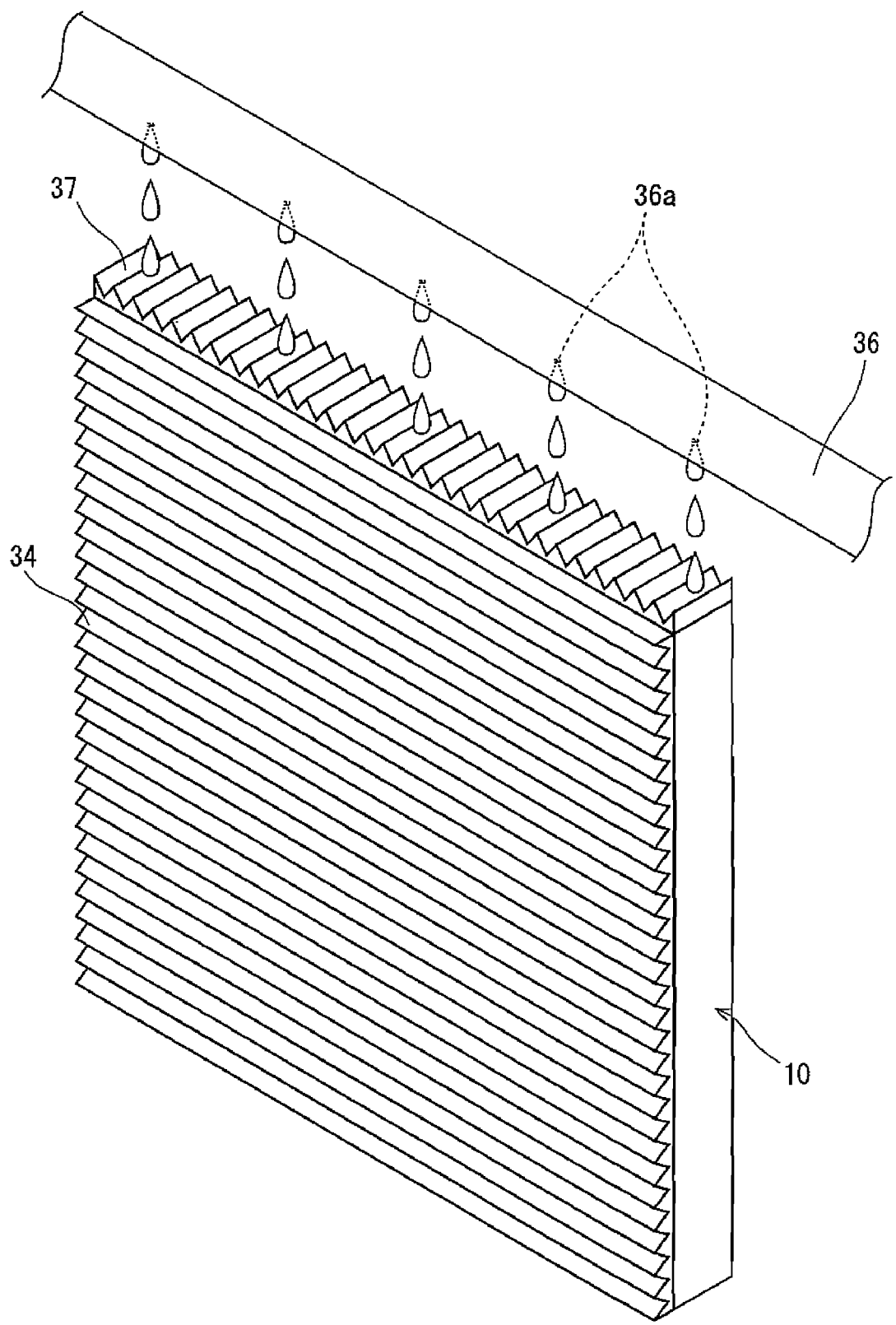
FIG. 15 is a perspective view showing a state that a water content is applied from holes of a hose to a water-retainable molding in still another embodiment of the present invention.

In addition, in the above-described embodiment, a water content is supplied from the surface 34, but the water content may be supplied from portions other than the surface 34. For example, as shown in FIG. 15, in a case that a water content is supplied from a side surface 37 of the platelike block 12, the side surface 37 of the platelike block 12 is cut, the water-retainable molding 10 is placed such that the side surface 37 is oriented to an upper direction, and a hose 36 with holes 36*a* is placed above the side surface 37. Then, when water flows through the hose 36, and the water droplets drop from the holes 36*a*, the water content is supplied to the water-retainable molding 10 from the side surface 37. The water content flows into the platelike block 12 from the openings of the respective first-fifth pores 22, 24, 28, 30, 32, is retained in the third pore 28, transferred through the first, second and fifth pores 22, 24 and 32, and finally evaporated from the surface 34. Thus, the water-retainable molding 10 can make water absorption and evaporation at the same time. Here, in FIG. 17, in the interest of clarify the surface 34, 37, the size of the concaves and convexes 34*a* are illustrated largely.

In the above-described embodiments, the fiber masses 16 are utilized as a water-retaining portion, but a porous member can be utilized as a water-retaining portion. The porous member is a particulate matter of a porous material, and the porous material has a large number of fine pores inside thereof, and the porous material includes calcined grains of kieselguhr, zeolite, peat swamp, bark compost, charcoal, vermiculite, bentonite, pearlite, pulp sludge incineration ash, active ash, or the like. The calcined grains of kieselguhr include a large number of fine pores having a pore size of 0.1-1 μm, and about 70% of the volume is occupied with the fine pores. Therefore, the fine pores can be used as a third pore 28 to retain a water content therein. Furthermore, since the calcined grains of kieselguhr are not swollen by inclusion of a water content, it is possible to maintain strength of the water-retainable molding 10.

In addition, in all the above-described embodiments, an antimicrobial agent may be added to cement to form a plate-like block 12. The antimicrobial agent includes both of an organic antimicrobial agent and an inorganic antimicrobial agent. The inorganic antimicrobial agent is one obtained by supporting an anti-bacterial material such as silver, copper, zinc, magnesium, or the like on a material including inorganic compound such as soluble glass, zeolite, apatite, silica, titanium oxides, or the like. When the platelike block 12 absorbs or retains a water content, by addition of such an antimicrobial agent, bacteria do not grow in the water-retainable molding 10. Thus, even if the water-retainable molding 10 is laid in the sidewalk, slime and bad smell due to bacteria do not occur, and therefore, pedestrians can walk on the water-retainable molding 10 safely and sanitarily.

Figure 16:
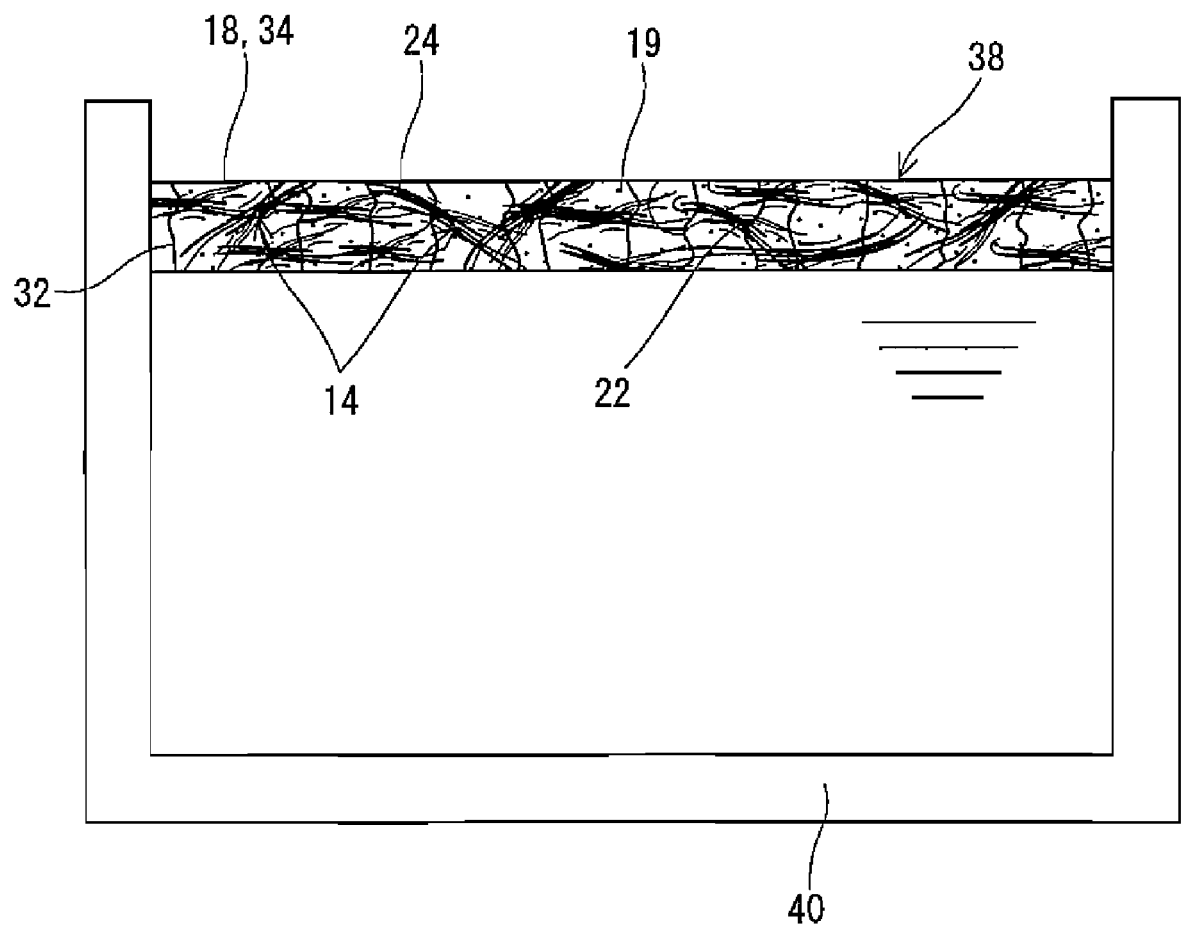
FIG. 16 is a cross-sectional view showing a state that the a platelike body in a further embodiment of the present invention and an aquarium are combined.

In addition, in all the above-described embodiments, the fiber bundles 14 and the fiber masses 16 are used in the water-retainable molding 10, but only the fiber bundles 14 may be used without utilizing the fiber masses 16. That is, the fiber masses 16 have a water retaining function in the water-retainable molding 10 as a main function, but if the water-retaining function is imparted to another member or material in place of the fiber masses 16, the function similar to the above description is provided. For example, as shown in FIG. 16, a plate-like member 38 obtained by hardening a mixture of a large number of fiber bundles 14 and cement is placed on an aquarium 40. Thus, a water content in the aquarium 40 reaches the surface 18, 34 through the first, second and fifth pores 22, 24 and 32 and is evaporated therefrom. By the evaporation, the plate-like member 38 can produce an effect of suppressing the rise of the surface temperature.

If all the above-described water-retainable moldings 10 are used as paving members for a road, a decorative plate can be put on the surface 18, 34. This makes it possible to prevent the surface 18, 34 from being worn.

Figure 17:
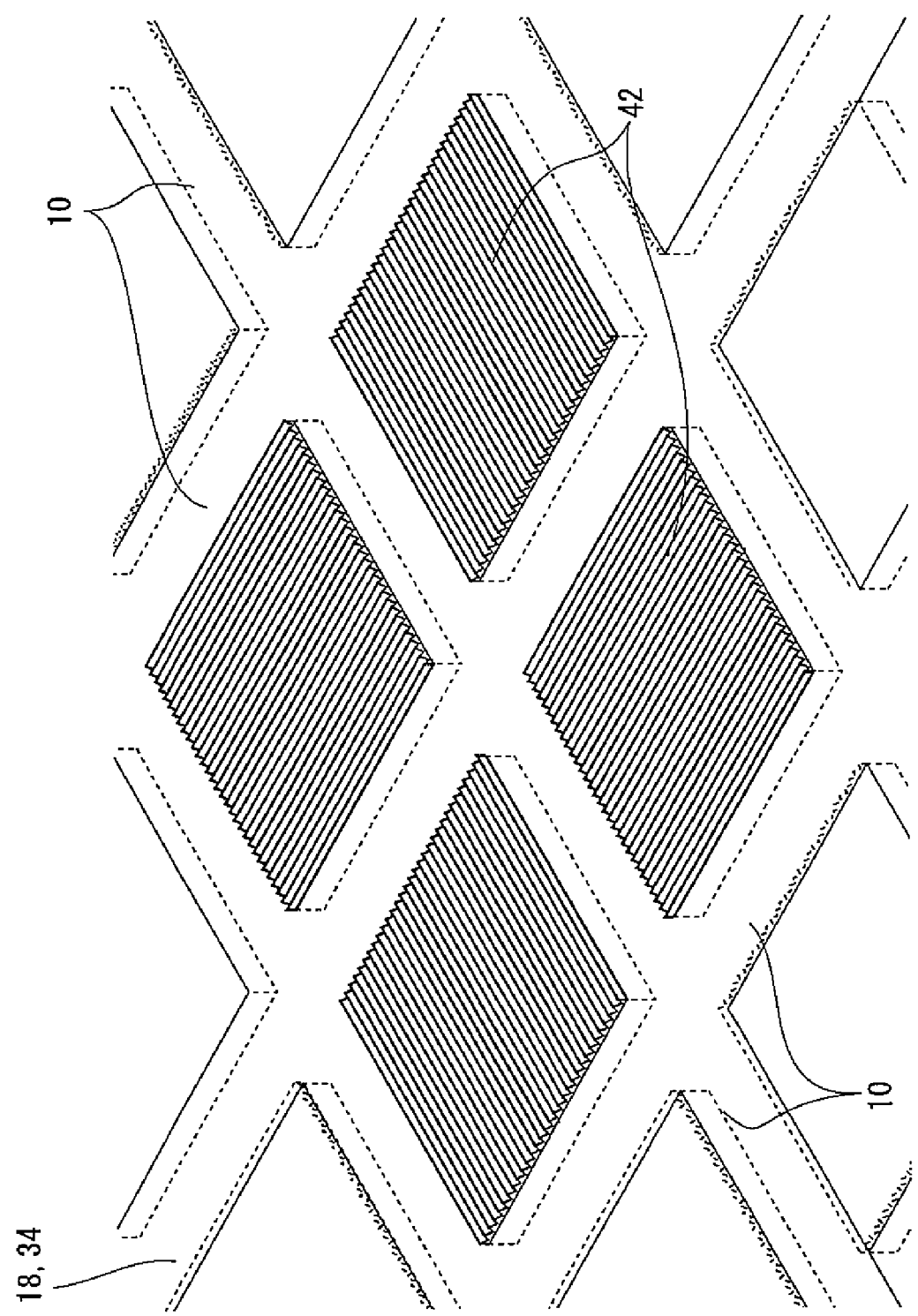
FIG. 17 is a perspective view showing a paving member combining water-retainable moldings in a further another embodiment of the present invention and blocks.

Furthermore, if all the above-described water-retainable formed moldings 10 are used as paving members for a road, blocks 42 and water-retainable moldings can be combined 10 as shown in FIG. 17. The block 42 is made of a material with high strength and surface tension, such as glass or stone, and has fine concaves and convexes on the surface. Then, a paving member is formed by arranging a plurality of blocks 42 at intervals, and paving water-retainable moldings 10 at the intervals. Thus, in the paving member, the blocks 42 mainly ensure strength, and the water-retainable molding 10 mainly ensures water absorption, water retentivity, evaporativity, and an effect of suppressing surface temperature rise. Here, since the block 42 has a large surface tension and fine concaves and convexes on the surface, a water content flowing from the surface 18, 34 spreads widely and thinly to the surface of the block 42, and evaporates from the surface of the block 42 as well as from the surface 18, 34, so that it is possible to produce an effect of suppressing a surface temperature rise on the entire paving member.

In addition, the above-described specific values of the angle and the size are merely one example and changeable as necessary.

Figure 18:
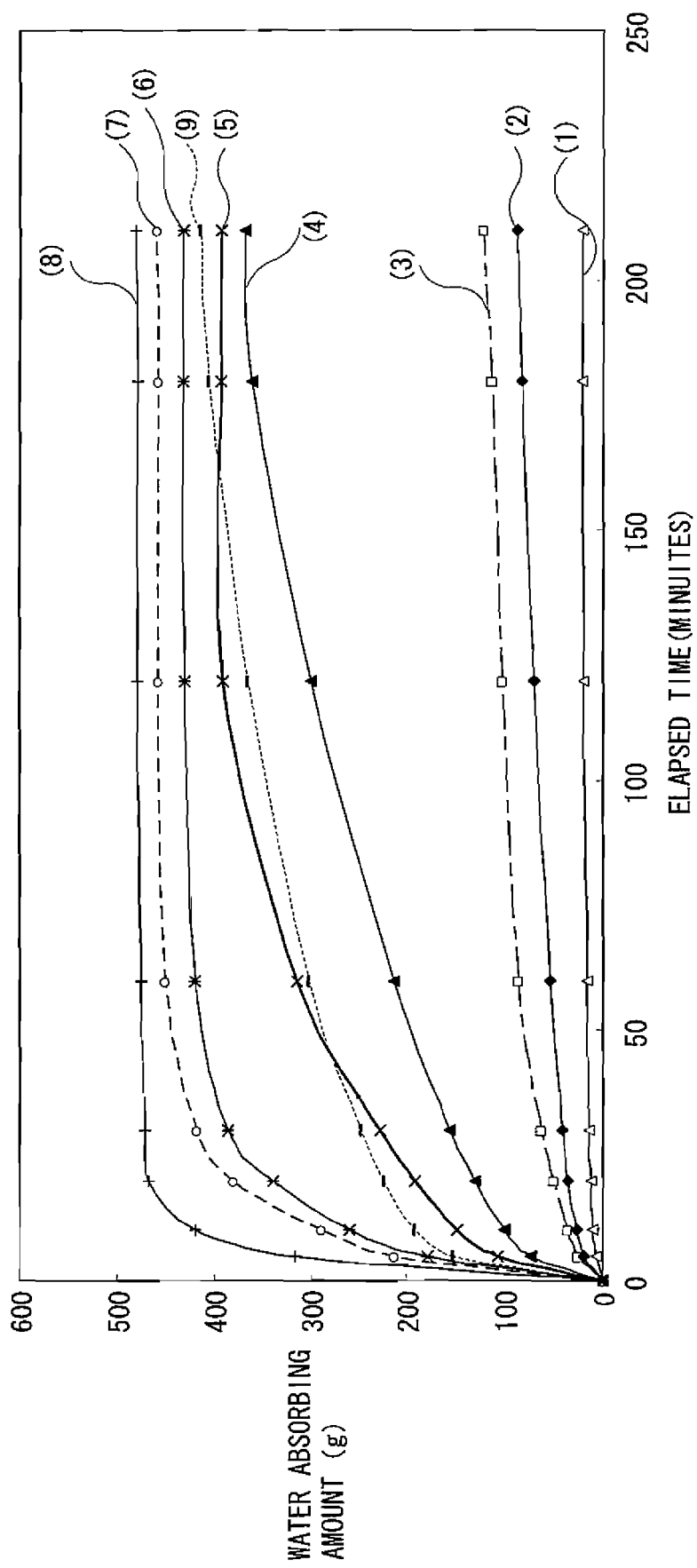
FIG. 18 is a graph showing a test result of water absorption of the water-retainable molding in association with a ratio of a total volume of fibers to a volume of cement.
Figure 19:
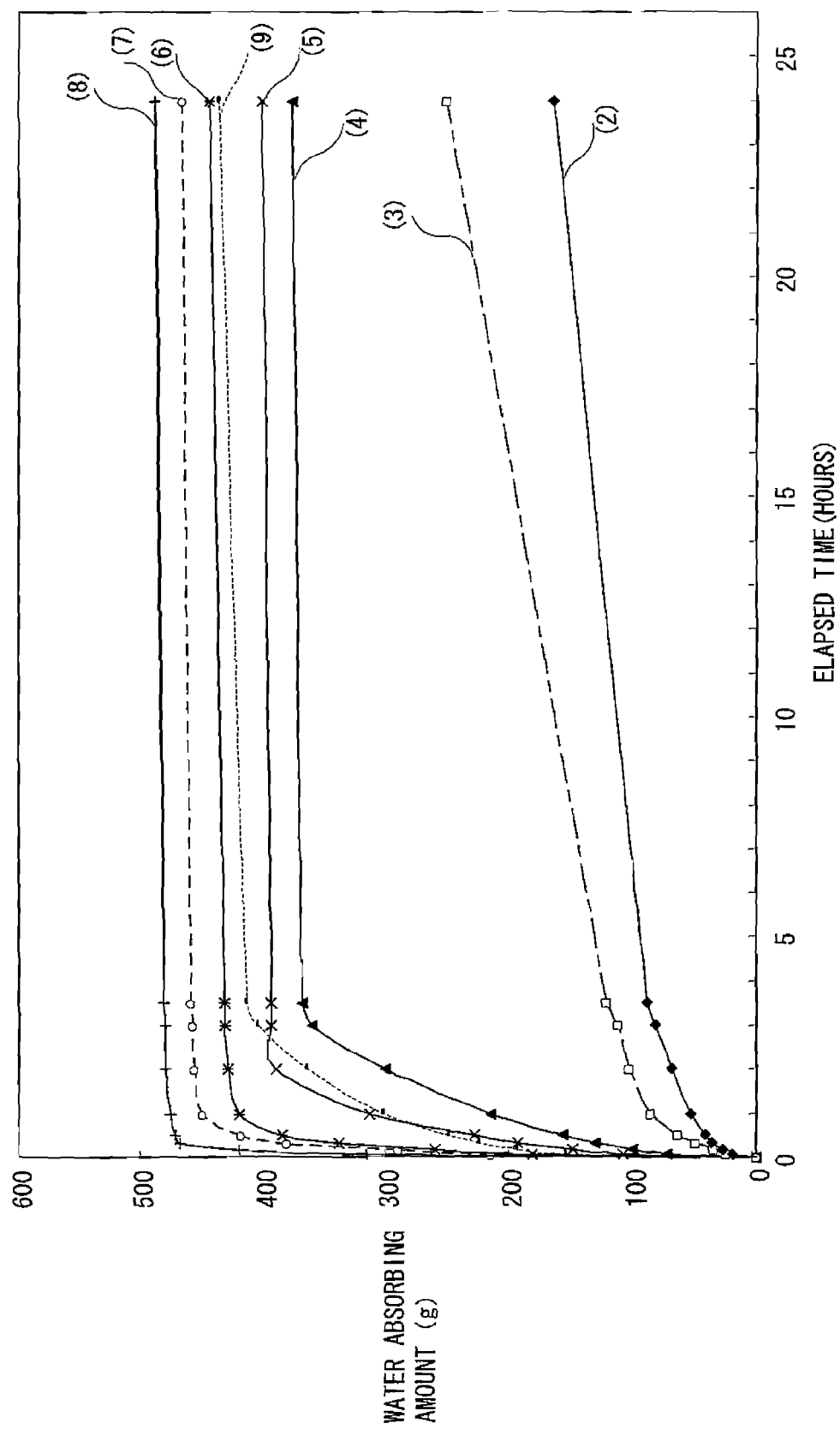
FIG. 19 is a graph showing a test result of water absorption of the water-retainable molding in association with a ratio of a total volume of fibers to a volume of cement.

Next, with respect to a ratio of the volume of the cement to the total volume of fibers, the water absorption of the water-retainable molding is tested, and the result is illustrated in FIG. 18 and FIG. 19. It should be noted that FIG. 18 shows a result of measurements at a start of the test, that is, after 210 minutes lapse from the start of the test, and FIG. 19 shows a result of measurements of the entire test, that is, after 24 hours lapse from the start of the test.

The sample in this test is obtained by mixing normal portland cement, fiber bundles made of rock wool and fiber masses made of rock wool, pressing the mixture in a molding tool from above to be hardened, and cutting the upper surface. Additionally, each sample is a platelike shape, and has 150 mm long and wide and 30 mm high.

As the sample, eight kinds of water-retainable moldings are used in which the ratio between the volume of the cement and the total volume of the fibers are changed. The total volume of the fibers in each sample: the volume of the cement is 1:9 in a sample (1), 2:8 in a sample (2), 3:7 in a sample (3), 4:6 in a sample (4), 5:5 in a sample (5), 6:4 in a sample (6), 7:3 in a sample (7), and 8:2 in a sample (8).

In the test, a water absorbing amount (g) of the water-retainable molding is evaluated by immersing the entire water-retainable molding in water, taking out the water-retainable molding after an adequate time lapse from the start of the test to measure the weight, and subtracting an initial weight of the water-retainable molding from the measured weight.

According to a result of the measurements in FIG. 18 and FIG. 19, the more the total volume of the fibers with respect to the volume of the cement is, the sharper the inclination of the water absorbing amount with respect to the time at early times is. That is, the more the fiber bundles and the fiber masses are, the higher a water absorbing speed of the water-retainable molding is. Furthermore, the more the total volume of the fibers with respect to the volume of the cement is, the more the water absorbing amount is. Thus, the more the fiber bundle and the fiber mass are, the better the water absorption of the water-retainable molding is.

In addition, in the samples (4)-(8), the water absorbing amounts after 210 minutes are constant, and the water contents become saturated in the water-retainable moldings. However, in the samples (1)-(3), the water absorbing amounts continue to increase after a lapse of 24 hours and the water absorbing amount is less, so that the continuity of the first-fifth pores inside the samples (1)-(3) is bad. Thus, it is preferable that the total volume of the volume of the fiber bundles and the volume of the fiber masses: the volume of the cement is 4:6-8:2.

Here, at the same time that the water absorption of the water-retainable molding in relation to the ratio between the volume of the cement and the total volume of the fibers is searched, the water absorption of the water-retainable molding in relation to the kind of the cement is also searched, and the result is shown in FIG. 18 and FIG. 19.

The samples in this embodiment are the same as the above-description except that alumina cement is used in place of normal portland cement, and therefore, a detailed description is omitted. In the sample (9), the total volume of the fibers:the volume of the cement is 7:3, and the ratio is the same as the sample (7). Furthermore, a test method is the same as the above description, and therefore, the description is omitted.

According to the test results in FIG. 18 and FIG. 19, the water absorbing amount in the sample (9) is lower than the water absorbing amount in the sample (7), and continues to increase after a lapse of 24 hours. Thus, it is considered that the first, second and fifth pores inside the platelike block using the alumina cement is thinner than the first, second and fifth pores inside the platelike block using the normal portland cement.

Figure 20:
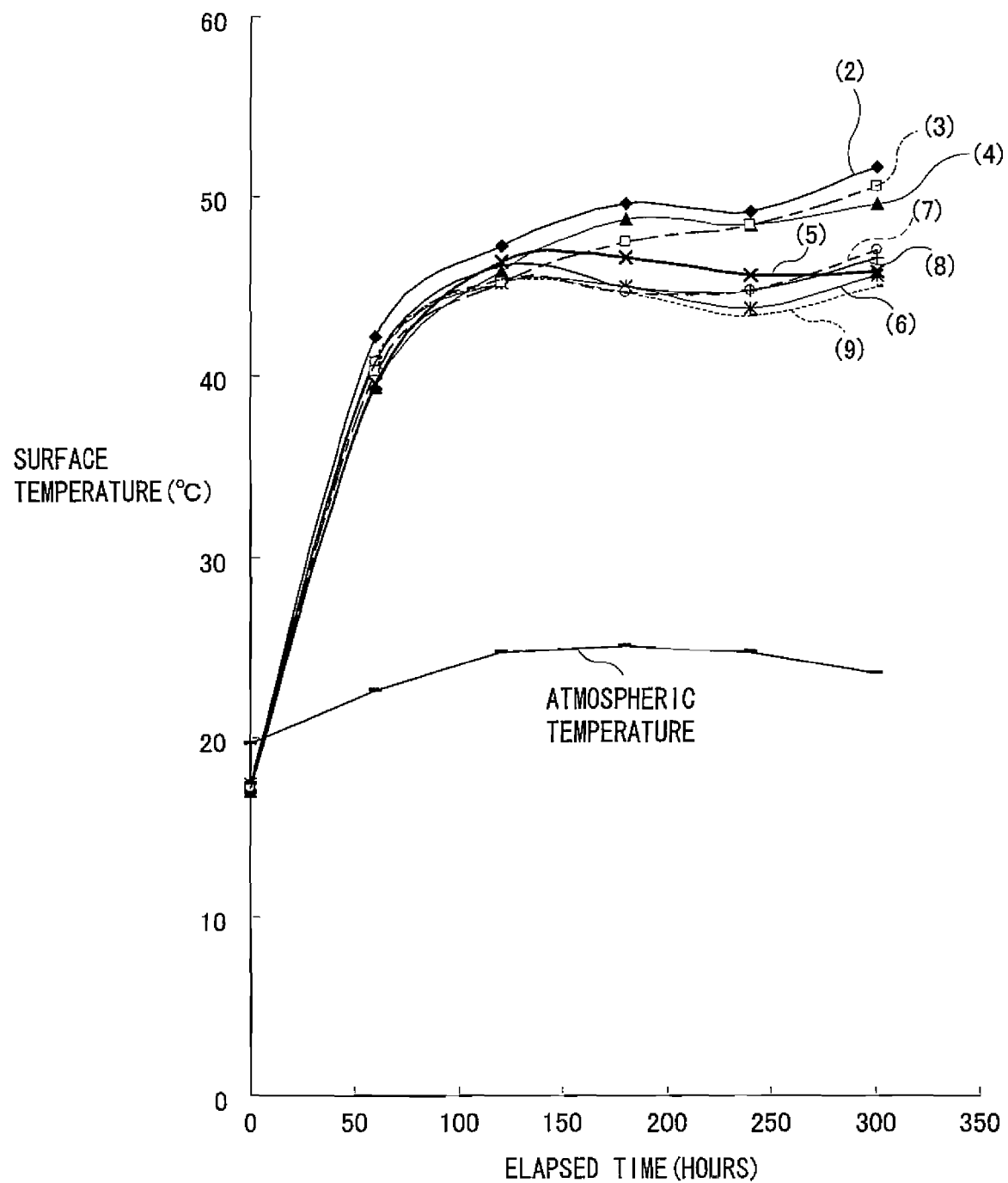
FIG. 20 is a graph showing a test result of an effect of suppressing a rise of a surface temperature of the water-retainable molding in association with a ratio of a total volume of fibers to a volume of cement.
Figure 21:
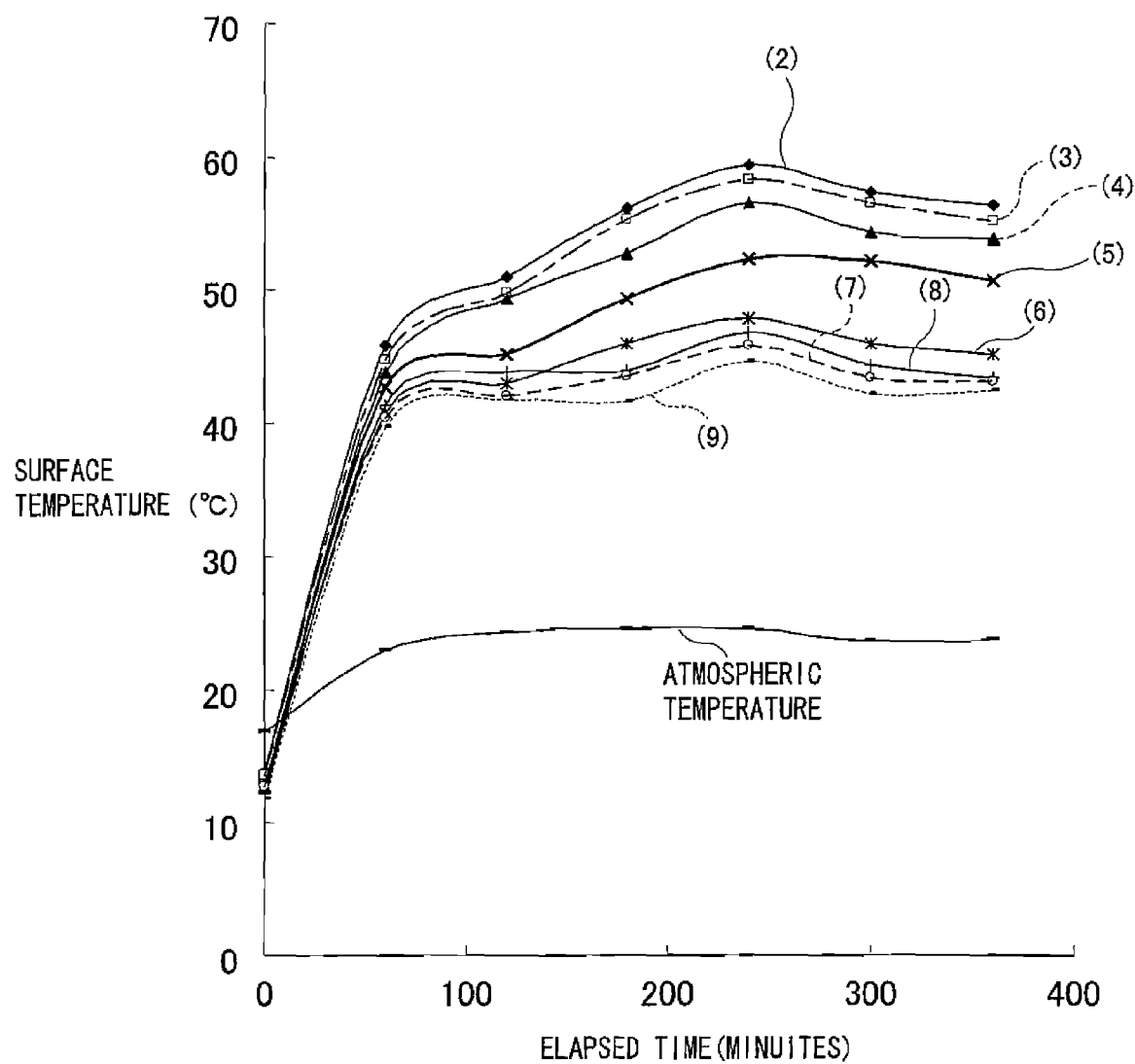
FIG. 21 is a graph showing a test result of an effect of suppressing a surface temperature rise of the water-retainable molding in association with a ratio of a total volume of fibers to a volume of cement.

Next, an effect of suppressing a surface temperature rise of the water-retainable molding in relation to the ratio between the volume of the cement and the total volume of the fibers is searched, and the result is shown in FIG. 20 and FIG. 21. It should be noted that the test is conducted for two days, and the test result on the first day is shown in FIG. 20, and the test result on the second day is shown in FIG. 21.

As to test samples of the effect of suppressing a surface temperature rise, samples the same as that in the above-described water absorption test are used.

In this test, before measurements, the respective samples are immersed in water for 12 hours so that the water content inside thereof is saturated. On the first day of the measurement, the respective samples are irradiated by a halogen lamp to measure surface temperatures of the samples. Without a water content being supplied to the samples, on the second day of measurement, surface temperatures of the samples are then measured. It should be noted that the amount of irradiation on the surface of the samples by the halogen lamp is set to be uniquely 1300 W.

According to the test results in FIG. 20 and FIG. 21, the more the total volume of the fibers with respect to the volume of the cement is, the lower the temperatures of the samples are, and the longer the low-temperature state is maintained. Thus, the more the fiber bundles and the fiber masses are, the better evaporativity and an effect of suppressing a surface temperature rise of the water-retainable molding are. Especially, the total volume of the fibers: the volume of the cement is preferably 4:6-8:2.

The reason why the samples maintain a low-temperature state is that the water amount retained in the platelike block is much, so that large amounts of the water contents are evaporated to decrease the temperature of the water-retainable molding. Furthermore, the reason why the temperature rise of the water-retainable molding is maintained for a long time is that the first, second and fifth pores in the platelike block are well continuous, so that the water content rapidly moves to the surface and is evaporated for a long time.

Here, at the same time that the effect of suppressing a surface temperature rise of the water-retainable molding in relation to the ratio between the volume of the cement and the total volume of the fibers is searched, an effect of suppressing a surface temperature rise of the water-retainable molding in relation to the kind of the cement is searched, and the result is shown in FIG. 20 and FIG. 21.

As a result of measurement results in FIG. 20 and FIG. 21, the temperature of the sample (9) is lower than all the temperatures of the samples (1)-(8). Thus, under the measurement condition, the alumina cement is superior to the normal portland cement in the effect of suppressing a surface temperature rise.

Figure 22:
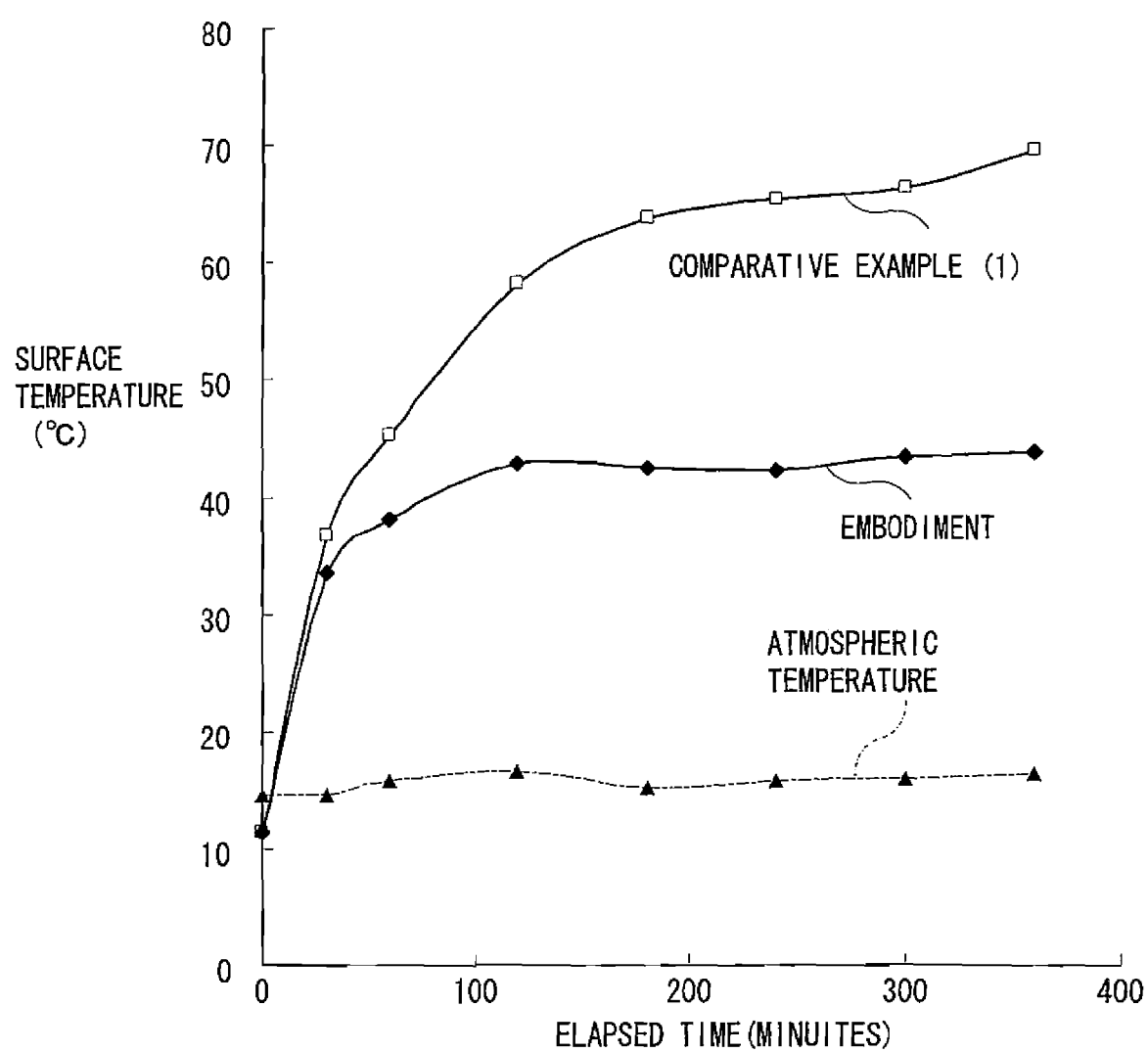
FIG. 22 is a graph showing a test result of an effect of suppressing a rise of the surface temperature of the water-retainable molding with respect to a comparative example (1)

Next, a suppressing performance of a surface temperature rise of the water-retainable molding is searched, and the result is shown in FIG. 22.

As to samples, a water-retainable molding the same as the foregoing sample (7) is used in this embodiment, and Aqua FS (manufactured by Nihon Kogyo Co., Ltd.) is used in a comparative example (1). Furthermore, in the test, a measurement is conducted in a similar manner to the foregoing test as to the effect of suppressing a surface temperature rise.

According to the measurement result in FIG. 22, the temperature in this embodiment is always lower than that in the comparative example (1). Furthermore, the temperature in the embodiment is substantially constant after 120 minutes lapse, but the temperature of the comparative example (1) rises over a period of time. The difference between the temperature in this embodiment and the temperature in the comparative example (1) is large over a period of time, and becomes about 26° C. after 360 minutes lapse. As a result, a suppressing performance of the surface temperature rise in this embodiment is far superior.

Figure 23:
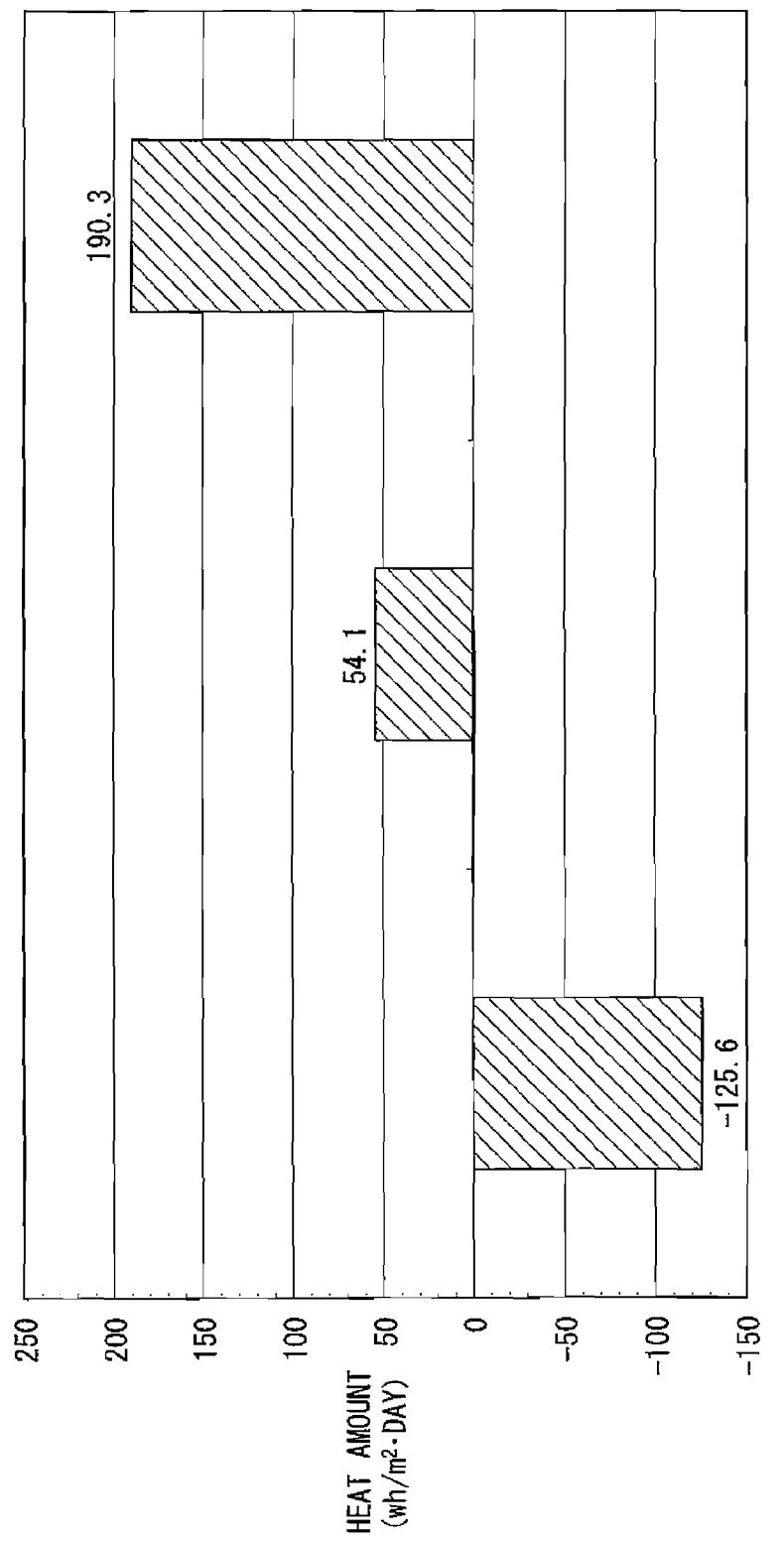
FIG. 23 is a graph showing a test result of an effect of suppressing a rise of a surface temperature (summer time) of the water-retainable molding with respect to comparative examples (2) and (3)

Next, a suppressing performance of the surface temperature rise of the water-retainable molding is searched in the way other than all the above-described tests of suppressing a surface temperature rise, and the result is shown in FIG. 23.

In this embodiment, as a sample, a slab plate covered with the water-retainable molding similarly to the above-described sample (7) is used, and a slab plate covered with turf of 150 mm high is applied to the example (2), and one laminated with a slab plate, a polystyrene board of 40 mm high and a slab plate is applied to the comparative example (3). Then, three wooden boxes with 1 m long and wide and 0.5 m high are prepared, and this embodiment, the comparative example (2) and the comparative example (3) are put on the respective boxes. It should be noted that the slab plate is 1 m long and wide and 50 mm high. Furthermore, the comparative example (3) corresponds to a heat insulating material defined by Urban Renaissance Agency (Japan).

Figure 24:
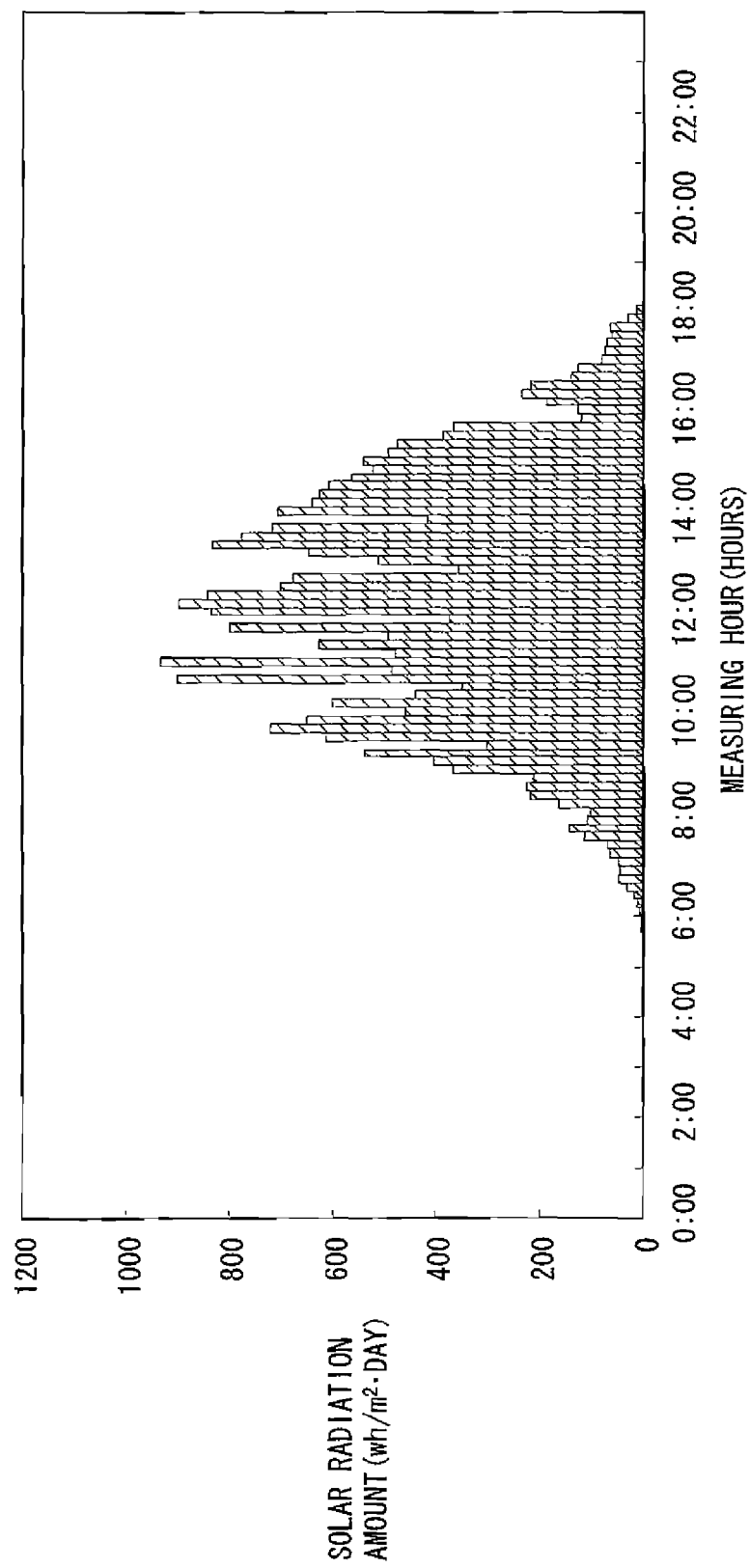
FIG. 24 is a graph showing values of solar radiation on the date of the test in FIG. 23.

In the test, before a start of measurements, the respective samples are supplied with water contents so as to be saturated, are left outdoor in the summer time. Thereafter, a flow of the amount of heat to the inner surface of the upper plate of the box from the surface of each sample is obtained. The heat flow is measured by a sensor HFP01 (manufactured by HUKSEFLUX Co., Ltd) and a voltmeter DATA-MINI3645 (manufactured by Hioki Electric Co., Ltd.). Additionally, values of solar radiation outdoor on the day of measurement are shown in FIG. 24.

According to the measurement in FIG. 23, since the amount of heat is plus in each of the comparative example (2) and the comparative example (3), the heat received on the surface of the samples flow into the boxes through the samples. On the contrary thereto, since the amount of heat in this embodiment is minus, the heat inside the box flows into the outside from the surface of the sample through the sample. As a result, this embodiment can draw off and dissipate the heat at the lower portion, and has a superior suppressing performance of the surface temperature rise. Additionally, if a building or house, a road, etc. are covered with a water-retainable molding, it is possible to reduce the thermal storage of the building or house, the road, etc., and therefore, the water-retainable molding is useful for a heat-island phenomenon.

Figure 25:
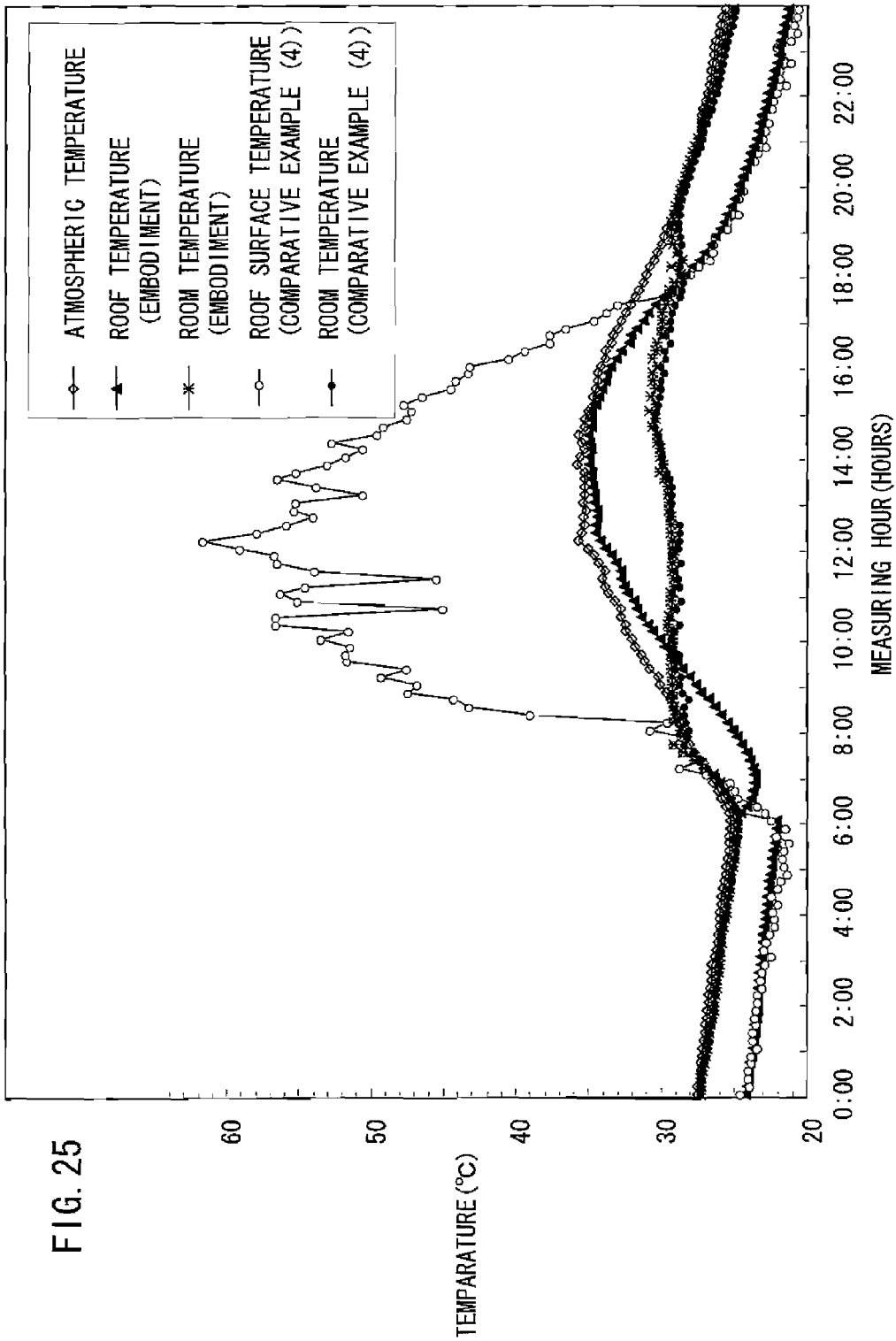
FIG. 25 is a graph showing a test result of an effect of suppressing a rise of surface temperature (summer time) of the water-retainable molding with respect to a comparative example (4)

A suppressing performance of the surface temperature rise of the water-retainable molding is searched in the way other than all the above-described tests of suppressing the surface temperature rise, and the result is shown in FIG. 25.

As to the samples, a super house (manufactured by Nagawa Co., Ltd.) is used in the comparative example (4), and a super house similar to the comparative example (4) with a roof paved with water-retainable moldings like the sample (7) in the above-described water absorption test is used in the embodiment. Additionally, the roof of the super house is formed by a color iron plate, and the size of the roof is 1800 mm long and 3600 mm wide, and an air conditioner is set in the super house.

Figure 26:
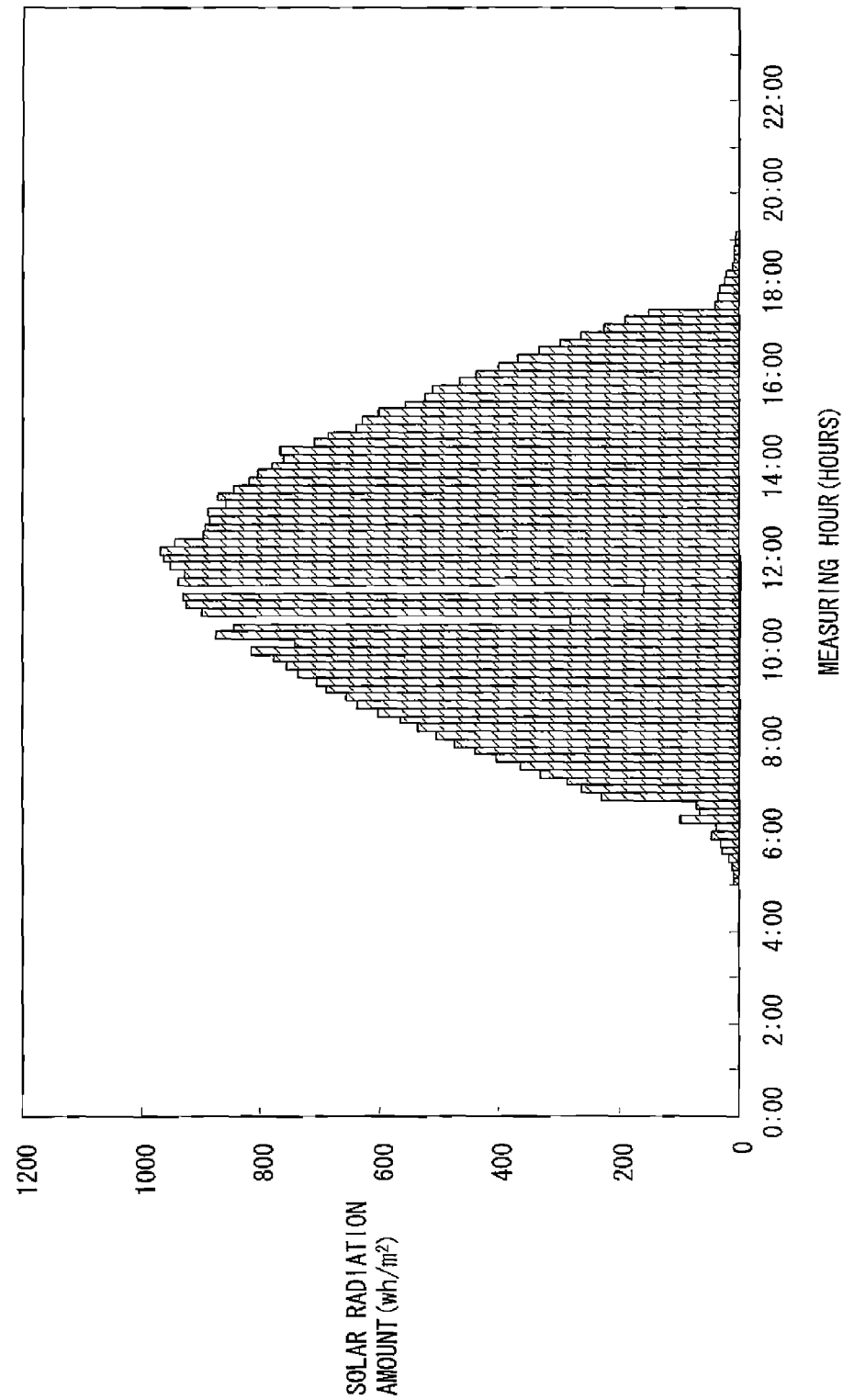
FIG. 26 is a graph showing values of solar radiation on the date of the test in FIG. 25.

In the test, the temperature of the air conditioner is set to 28° C., and temperatures on the roof and in the room of the super house of each of the samples are measured. In addition, the values of solar radiation outdoor on that measurement day are shown in FIG. 26.

According to the result of the measurement in FIG. 25, the temperature of the roof in the comparative example (4) is higher than atmospheric temperature between the hours of 8-18, and reaches a maximum temperature of 62° C. On the contrary thereto, the temperature of the roof in this embodiment is lower than atmospheric temperature all day, and has a maximum temperature of the order of 35° C. As a result, the embodiment has a superior suppressing performance of the surface temperature rise, and moreover has a function of cooling the atmosphere because the temperature of the roof is lower than the atmospheric temperature.

Additionally, in both of the embodiment and the comparative example (4), room temperatures approximately indicate the same temperature because they are adjusted by air conditioners. However, when the electric power consumption (kWh/day) of the air conditioner is searched, the electric power consumption in this embodiment is 2.9 (kWh/day) whereas the electric power consumption of the comparative example (4) is 4.1 (kWh/day). Thus, by covering the roof of the super house with the water-retainable molding in this embodiment, it is possible to reduce the electric power consumption by 29.3%, and it is found that the water-retainable molding in this embodiment is useful for energy conservation. Furthermore, global-warming gases by the heat-island phenomenon increase the use of an air-conditioner, and the exhaust heat by the air-conditioner further advances the heat-island phenomenon. However, the water-retainable molding makes it possible to reduce the electric power consumption, that is, the use of the air-conditioner and the heat exhaust by the air-conditioner, and a vicious cycle of the heat-island phenomenon.

As shown in the result of the measurements shown in foregoing FIG. 23 and FIG. 25, it is found that the embodiment can produce a good effect of suppressing a surface temperature rise, but on fears that the embodiment is too cooled during wintertime, a surface temperature of the water-retainable molding during wintertime is measured. The result is shown in FIG. 27.

As to the samples, samples the same as those in FIG. 23 are used. Furthermore, the way of the test is similar to that in FIG. 23, but in FIG. 23, an amount of heat from the surface of the sample to the inner surface of the upper plate of the box is obtained whereas in FIG. 27, a surface temperature of the inner surface of the upper plate of the box of each sample is measured. Additionally, the values of solar radiation on this day of measurement outdoor are shown in FIG. 28.

Figure 27:
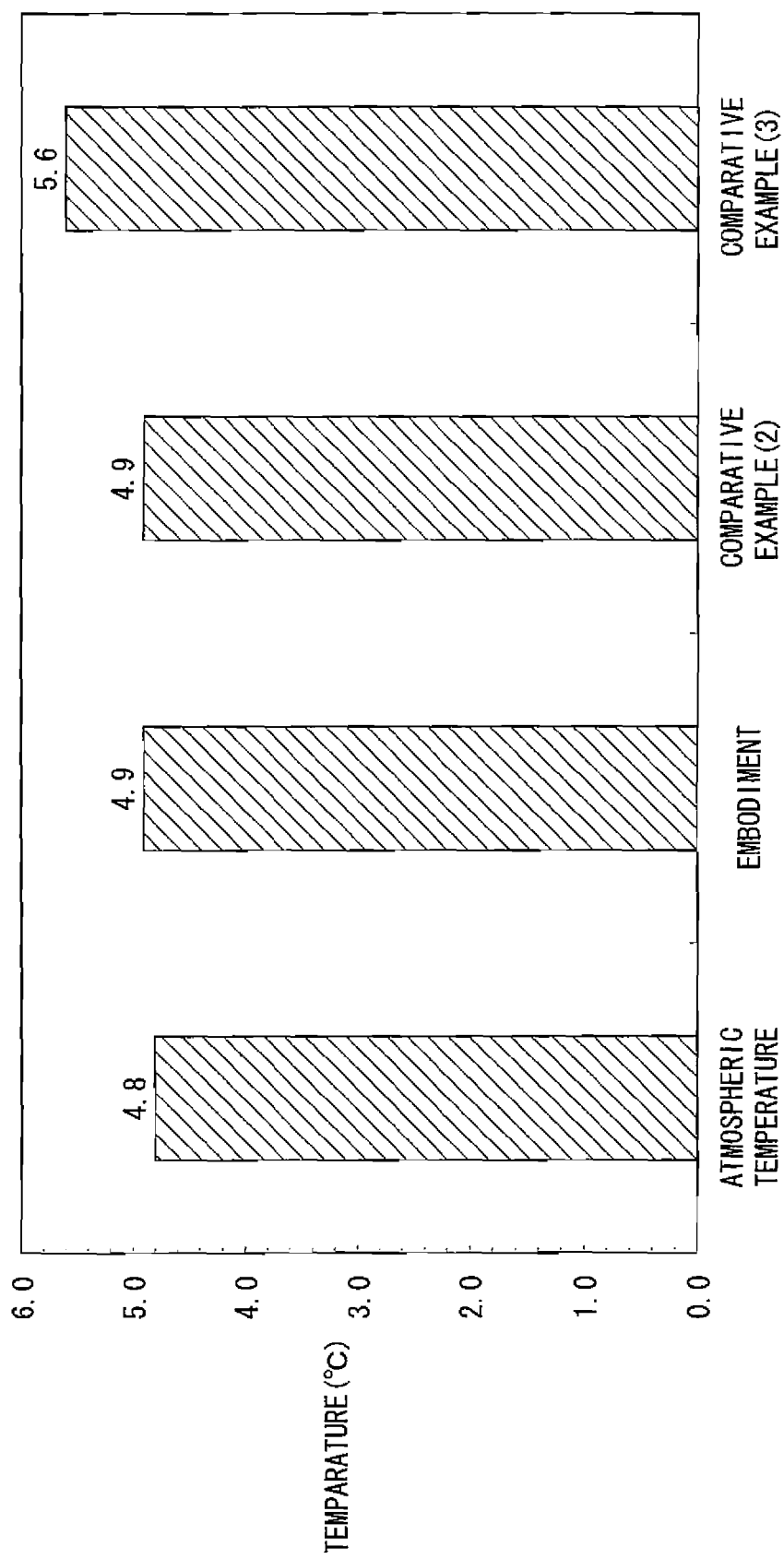
FIG. 27 is a graph showing a test result of average temperatures (during wintertime) of the water-retainable molding.
Figure 28:
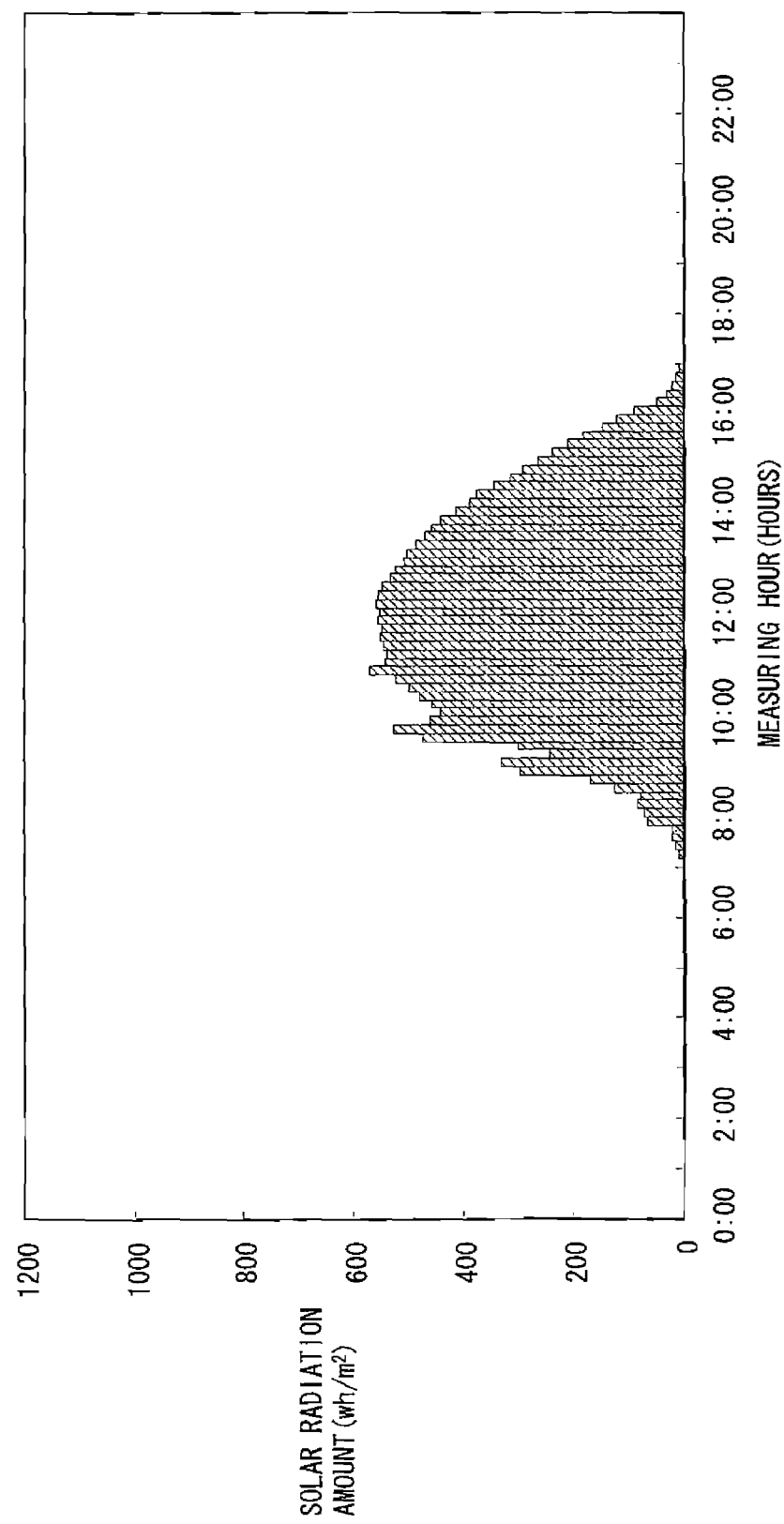
FIG. 28 is a graph showing values of solar radiation on the date of the test in FIG. 27.

According to a result of the measurements in FIG. 27, an average temperature in this embodiment is of the order of an average temperature of the atmospheric temperature and an average temperature of the comparative example (2), so that it is found that it is not so cooled even during wintertime in this embodiment.

Furthermore, as to a performance of suppressing a surface temperature rise of the embodiment during wintertime, the average temperature in this embodiment is as good as turf in the comparative example (2) in which an effect of suppressing surface temperature rise is generally high, and is lower than the average temperature in the comparative example (3).

Thus, it is found that the embodiment has a fine effect of suppressing a surface temperature rise also during wintertime.

Figure 29:
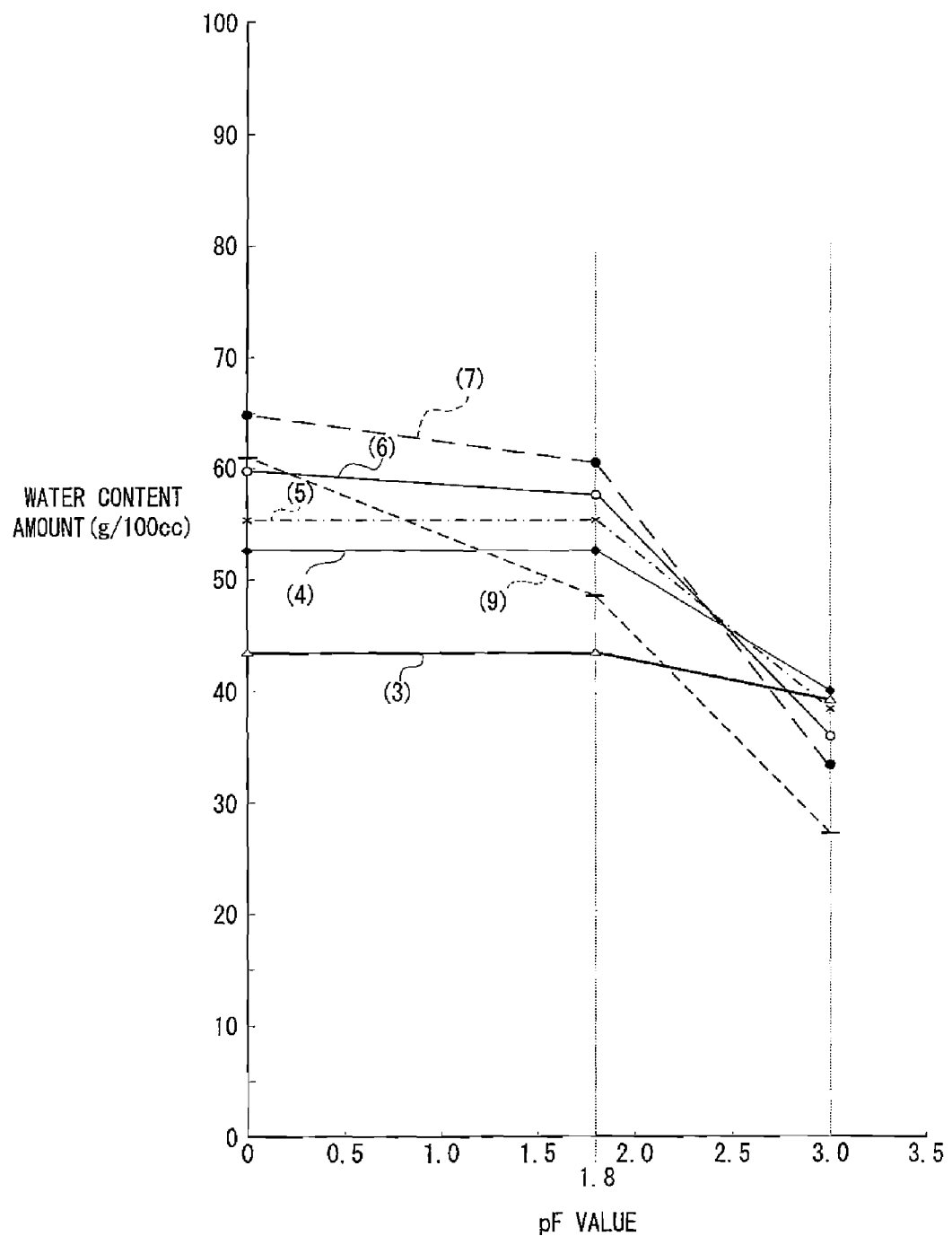
FIG. 29 is a graph showing a test result of water retentivity of the water-retainable molding in association with a ratio of a total volume of fibers to a volume of cement.

Next, as to the ratio between the volume of the cement and the total volume of the fibers, the water retentivity of the water-retainable molding is searched, and the result is shown in FIG. 29.

In the sample of the test, samples the same as the test of the water absorption in FIG. 18 and FIG. 19 are used. For measuring the amount of the water content of pF 1.8, a Multi-Fold pF Meter DIK-3420 (manufactured by Daiki Rika Kogyo Co., Ltd.) and a Digital automatic pressure controller DIK-9211 (manufactured by Daiki Rika Kogyo Co., Ltd.) are utilized, and for measuring the amount of the water content of pF3, a centrifuge 50A-IVD (Sakuma Co., Ltd.) is utilized.

According to the result of the measurement in FIG. 29, as to the all samples, the amount of the water contents are scarcely decreased from pF0 to pF1.8. More specifically, the value obtained by subtracting the amount of the water content of pF0 from the amount of the water content of pF1.8 is 0 (g/100 cc) in each of the samples (3)-(5), is 4.2 (g/100 cc) in the sample (2), and is 13.7 (g/100 cc) in the sample (9). Because of no difference or less difference between the amounts of the water contents, it is found that the ratio of the gravitational water out of the waters content retained in each of the samples is decreased, so that the water-retainable molding has superior water retentivity. Furthermore, the water content below pF 1.5 of the rock wool is 65-85% of the water content retained in the rock wool, and therefore, and the water-retainable molding is thus superior to the rock wool in water retentivity.

Furthermore, the ratio of the amount of the water content below pF3 to the amount of water of pF 0 is 91(%) in the sample (3), 76(%) in the sample (4), 70(%) in the sample (5), 61(%) in the sample (6), 51(%) in the sample (7), and 39(%) in the sample (9). The water amount functions as a capillary water, so that it is found that the water-retainable molding has large amounts of capillary portions inside thereof.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A water-retainable molding comprising:
a platelike block with a surface, which platelike block is made of a cement gel that is obtained by hardening cement,
a water-retaining portion formed in said platelike block,
a capillary portion formed in said platelike block, and extending from said water-retaining portion to said surface, and
a water communicating opening portion formed inside said platelike block, and extending from said water-retaining portion to said surface, said water communicating opening portion being thicker than said capillary portion;
said molding further comprising
a fiber bundle in said platelike block, said fiber bundle being made up of thin fibers collected in a longitudinal shape with internal spaces therebetween, and
a fiber mass in said platelike block, said fiber mass being made up of thin fibers collected in a rounded shape with internal spaces therebetween,
wherein
said capillary portion includes voids formed between said fiber bundle and said cement gel,
said water-retaining portion includes said internal spaces of said fiber mass, and
said water communicating opening portion includes voids formed between said adjacent fiber mass.

2. A water-retainable molding according to claim 1, wherein said surface includes a hydrophilic surface.

3. A water-retainable molding according to claim 2, wherein said hydrophilic surface includes concaves and convexes formed by inclined flat surfaces.

4. A water-retainable molding according to claim 1, wherein said capillary portion has a diameter thinner toward said surface.

5. A water-retainable molding according to claim 1, wherein each of the voids formed between said fiber bundle and said cement gel is thinner than each of said internal spaces of said fiber mass.

6. A water-retainable molding comprising:
a platelike block with a surface, which platelike block is made of a cement gel that is obtained by hardening cement,
a water-retaining portion formed in said platelike block,
a capillary portion formed in said platelike block, and extending from said water-retaining portion to said surface, and
a water communicating opening portion formed inside said platelike block and extending from said water-retaining portion to said surface, said water communicating opening portion being thicker than said capillary portion;
said molding further comprising
a fiber bundle in said platelike block, said fiber bundle being made up of thin fibers collected in a longitudinal shape with internal spaces therebetween, and
a porous member provided inside said platelike block and having pores inside thereof, wherein
said capillary portion includes voids formed between said fiber bundle and said cement gel,
said water-retaining portion includes said pores of said porous member, and
said water communicating opening portion includes voids formed between said adjacent porous members.

7. A water-retainable molding according to claim 6, wherein each the voids formed between said fiber bundle and said cement gel is thinner than each of said pores of said porous member.

8. A water-retainable molding according to claim 5, wherein a part of said fiber bundle is exposed to said surface.

9. A water-retainable molding according to claim 1, wherein said thin fiber includes rock wool.

10. A water-retainable molding according to claim 1, wherein said thin fiber includes cellulose fiber.

11. A water-retainable molding according to any one of claims 1-4, wherein said cement includes at least one selected from a group including resin, portland cement, alumina cement and white cement.

\* \* \* \* \*